US012806525B2

(12) United States Patent
Long

(10) Patent No.: US 12,806,525 B2
(45) Date of Patent: Nov. 24, 2026

(54) PATH PLANNING METHOD FOR VIRTUAL CHARACTER, AND ELECTRONIC DEVICE AND NON-TRANSITORY COMPUTER-READABLE STORAGE MEDIUM THEREOF

(71) Applicant: NETEASE (HANGZHOU) NETWORK CO., LTD., Hangzhou (CN)

(72) Inventor: Ke Long, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 207 days.

(21) Appl. No.: 18/701,263

(22) PCT Filed: May 25, 2022

(86) PCT No.: PCT/CN2022/095030
§ 371 (c)(1),
(2) Date: Apr. 15, 2024

(87) PCT Pub. No.: WO2023/137938
PCT Pub. Date: Jul. 27, 2023

(65) Prior Publication Data
US 2024/0408491 A1 Dec. 12, 2024

(30) Foreign Application Priority Data
Jan. 19, 2022 (CN) ......................... 202210061294.3

(51) Int. Cl.
*A63F 13/56* (2014.01)

(52) U.S. Cl.
CPC .................................... *A63F 13/56* (2014.09)

(58) Field of Classification Search
CPC ...................................................... A63F 13/56
See application file for complete search history.

(56) References Cited

U.S. PATENT DOCUMENTS

| | | | | |
|---|---|---|---|---|
| 8,706,413 | B2 * | 4/2014 | Gupta | G01C 21/206 701/434 |
| 10,460,075 | B2 * | 10/2019 | Hasegawa | A61B 10/0233 |
| 10,650,591 | B1 * | 5/2020 | Muskin | G06F 3/011 |
| 10,792,568 | B1 * | 10/2020 | Merrill | A63F 13/56 |

(Continued)

FOREIGN PATENT DOCUMENTS

| | | |
|---|---|---|
| CN | 106651987 A | 5/2017 |
| CN | 108742700 A | 11/2018 |

(Continued)

OTHER PUBLICATIONS

1st Office Action dated Jun. 26, 2025 of Chinese Application No. 202210061294.3.

(Continued)

*Primary Examiner* — Xuan M Thai
*Assistant Examiner* — Shauna-Kay Hall
(74) *Attorney, Agent, or Firm* — Qinghong Xu

(57) ABSTRACT

A path planning method for a virtual character, an electronic device and a non-transitory storage medium are provided. The method includes acquiring a start and end points of the virtual character in a game scene, and determining an initial path sequence connecting the start and end points based on the game scene; obtaining a fitting curve by performing curve fitting on the initial path sequence; obtaining a sampling path sequence by sampling the fitting curve; determining a plurality of sub-path sequences for forming bends in the sampling path sequence; when a turning radius of the turning path point in the sub-path sequence is less than a preset first turning radius threshold, updating a path corresponding to the sub-path sequences in the fitting curve by re-performing the curve fitting on the turning path points in the sub-path sequence, and obtaining a target path sequence by sampling an updated fitting curve.

16 Claims, 7 Drawing Sheets

(56) References Cited

U.S. PATENT DOCUMENTS

| | | | | |
|---|---|---|---|---|
| 11,615,580 | B2 * | 3/2023 | Daniels | G06T 7/292 345/419 |
| 11,803,995 | B2 * | 10/2023 | Xu | G06F 3/011 |
| 2007/0198178 | A1 * | 8/2007 | Trimby | G06N 5/01 701/533 |
| 2007/0265087 | A1 * | 11/2007 | Akahori | A63F 13/5258 463/37 |
| 2007/0276709 | A1 * | 11/2007 | Trimby | A63F 13/00 705/6 |
| 2009/0197686 | A1 * | 8/2009 | Bergelt | A63F 13/45 463/43 |
| 2010/0304859 | A1 * | 12/2010 | Yamada | A63F 13/2145 463/31 |
| 2015/0022447 | A1 * | 1/2015 | Hare | G06F 3/017 345/158 |
| 2016/0358378 | A1 * | 12/2016 | Wang | G06Q 10/047 |
| 2018/0012403 | A1 * | 1/2018 | Luo | A63F 13/358 |
| 2018/0250595 | A1 * | 9/2018 | Kurabayashi | A63F 13/55 |
| 2019/0012832 | A1 * | 1/2019 | Sun | G06T 19/003 |
| 2020/0294311 | A1 * | 9/2020 | Holz | H04N 13/271 |
| 2020/0316473 | A1 * | 10/2020 | Qiu | A63F 13/56 |
| 2020/0324196 | A1 * | 10/2020 | Nakamura | A63F 13/56 |
| 2020/0326711 | A1 * | 10/2020 | Rimmer | G01C 21/203 |
| 2022/0108621 | A1 * | 4/2022 | Li | G05D 1/042 |
| 2022/0305385 | A1 * | 9/2022 | Konno | A63F 13/35 |
| 2023/0015235 | A1 * | 1/2023 | Van Der Heijden | G01C 21/3881 |

FOREIGN PATENT DOCUMENTS

| | | | |
|---|---|---|---|
| CN | 109276884 | A | 1/2019 |
| CN | 110162029 | A | 8/2019 |
| CN | 110490978 | A | 11/2019 |
| CN | 111701242 | A | 9/2020 |
| CN | 111712212 | A | 9/2020 |
| CN | 111737637 | A | 10/2020 |
| CN | 111897286 | A | 11/2020 |
| CN | 112076477 | A | 12/2020 |
| CN | 112619139 | A | 4/2021 |
| CN | 112870720 | A | 6/2021 |
| CN | 113064430 | A | 7/2021 |
| CN | 113101663 | A | 7/2021 |
| CN | 113487693 | A | 10/2021 |
| CN | 113521742 | A | 10/2021 |
| CN | 114404985 | A | 4/2022 |
| WO | 2019204296 | A1 | 10/2019 |
| WO | 2020237890 | A1 | 12/2020 |

OTHER PUBLICATIONS

International Search Report dated Oct. 14, 2022 of International Application No. PCT/CN2022/095030.

Notice of Allowance dated Jan. 26, 2026 of Chinese Application No. 202210061294.3.

* cited by examiner

PATH PLANNING METHOD FOR VIRTUAL CHARACTER, AND ELECTRONIC DEVICE AND NON-TRANSITORY COMPUTER-READABLE STORAGE MEDIUM THEREOF

CROSS-REFERENCE TO RELATED APPLICATIONS

The present disclosure is a U.S. National Phase Application of International Application No. PCT/CN2022/095030, filed on May 25, 2022, which is based on and claims the priority of China Patent Application No. 202210061294.3 filed on Jan. 19, 2022, entitled "PATH PLANNING METHOD AND APPARATUS FOR VIRTUAL CHARACTER, ELECTRONIC DEVICE, AND STORAGE MEDIUM", and the entire contents of both of which are incorporated herein by reference for all purposes.

TECHNICAL FIELD

The present disclosure relates to a field of computer technology, and in particular, to a path planning method and apparatus for a virtual character, an electronic device and a non-transitory storage medium.

BACKGROUND

A virtual character controlled by artificial intelligence (AI), as a virtual character added to a game, is an important participant in the game, which plays an important role in protecting novices, improving matching speed, customizing game content and long-term operation of the game. For a movable AI virtual character, it is very important to find a path that meets the constraints if the virtual character needs to move from any given start position to the end position in the scene. In general, a sequence of waypoints connecting the start position and the end position is called a path, and a strategy of forming the path is called path planning.

It should be noted that the information disclosed in this section is turned only for enhancing understanding of the BACKGROUND of the disclosure, and therefore, may contain information that does not constitute the prior art that is already known to those skilled in the art.

SUMMARY

The present disclosure provides a path planning method and apparatus for a virtual character, an electronic device and a non-transitory storage medium, including the following.

A path planning method for a virtual character is provided and includes:

- acquiring a start point and an end point of the virtual character in a game scene, and determining an initial path sequence connecting the start point and the end point based on the game scene;
- obtaining a fitting curve by performing curve fitting on the initial path sequence;
- obtaining a sampling path sequence by sampling the fitting curve, where the sampling path sequence includes a plurality of sampling path points;
- determining a plurality of sub-path sequences for forming bends in the sampling path sequence, where each sub-path sequence consists of turning path points forming a same bend; and
- when a turning radius of the turning path point in the sub-path sequence is less than a preset first turning radius threshold, updating a path corresponding to the sub-path sequences in the fitting curve by performing the curve fitting on the turning path points in the sub-path sequence again, and obtaining a target path sequence by sampling an updated fitting curve.

An electronic device includes a processor, a memory, and a computer program stored in the memory and capable of running on the processor, where the computer program, when executed by the processor, realizes the steps of the path planning method for the virtual character as described above.

There is provided a non-transitory computer-readable storage medium on which a computer program is stored, and when executed by a processor, the computer program realizes the steps of the path planning method for the virtual character as described above.

BRIEF DESCRIPTION OF THE DRAWINGS

In order to explain the technical scheme of the present disclosure more clearly, the accompanying drawings in the specification of the present disclosure will be briefly introduced below. Obviously, the accompanying drawings in the following description are only some embodiments of the present disclosure. For those skilled in the art, other accompanying drawings may be obtained from these accompanying drawings without any creative effort for those skilled in the art.

DETAILED DESCRIPTION

Figure 1:
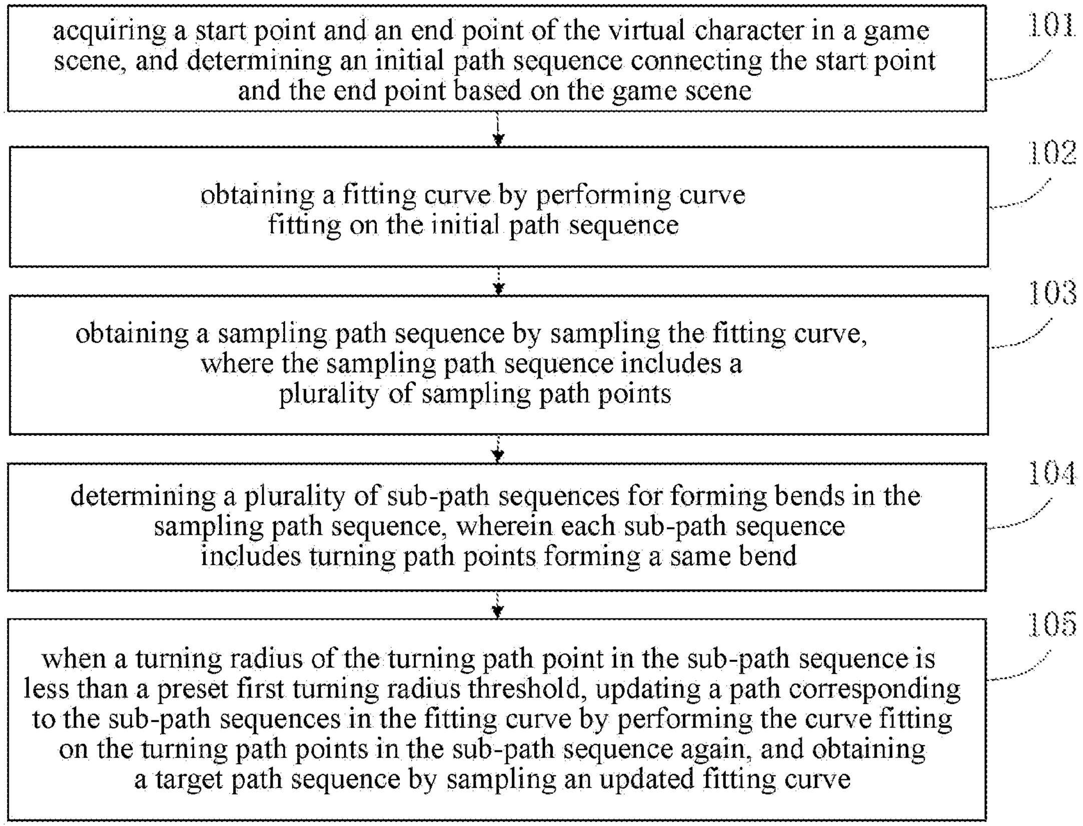
FIG. 1 is a flow chart of steps of a path planning method for a virtual character in one or more embodiment of the present disclosure.

In order to make the above objects, features and advantages of the present disclosure more obvious and easier to understand, the present disclosure will be further described in detail with reference to the accompanying drawings and specific embodiments. Obviously, the described embodiment is a part of the embodiments of the present disclosure, not the whole embodiments. Based on the embodiments in the present disclosure, all other embodiments obtained by those skilled in the art without creative work belong to the protection scope of the present disclosure.

In a game application, a virtual character controlled by AI is usually added, and a simulation degree of the virtual character controlled by AI largely determines the playability of the game. Movement is the most basic action instruction of the virtual character controlled by AI, and a level of the movement operation of the virtual character controlled by AI directly affects the simulation degree of the virtual character.

The level of the movement operation may be directly reflected in the intelligence of the path planning method.

When the virtual character controlled by AI moves, there are specific kinematic constraints on the virtual character, including a minimum turning radius constraint and a turning speed constraint. For wheeled carriers such as automobiles, the turning wheels generally determine a forward direction. The minimum turning radius refers to a radius of a track circle that a center of the outer turning wheel rolls on the supporting plane when the turning wheels reaches the limit position and the carrier turns at the lowest stable speed. If a curvature of the path is too large and the turning radius is less than the minimum turning radius of the carrier, the carrier cannot follow the path. Moreover, the turning of the virtual character is also limited by the turning speed and cannot be completed instantly. When there is a sudden change in orientation at the waypoint, tracked carriers that may turn in place is required to stop and perform the turning, while the wheeled carriers may not be able to pass.

In the related art, the path planning is generally performed by converting the game scene into a data object and then running a search algorithm on the data object. The obtained path points are not smooth, uneven, too high in curvature, and the direction of the path sequence is inconsistent with the initial orientation of the virtual character controlled by AI, resulting in the virtual character controlled by AI may not be able to move according to the kinematics law, and the mobile simulation degree is low.

There are following problems in the path sequence obtained by the existing path planning scheme: 1) the path points are not smooth, and the direction of connecting lines between the path points changes sharply, which leads to a character controlled by AI not moving smoothly; 2) the path points are uneven, and a difference of the distance between adjacent path points in the path sequence is too large, which is not conducive to controlling a movement of the character controlled by AI; 3) curvature of the path points is too high, and a turning radius of a bend composed of several continuous path points may be too small in the path sequence, which may not meet the movement requirement of the character controlled by AI in line with kinematics; 4) a starting problem, i.e., the direction of the path sequence is inconsistent with an initial orientation of the character controlled by AI. When the virtual character controlled by AI cannot turn in place, the character controlled by AI cannot use the path sequence.

In view of this, an embodiment of the present disclosure provides a path planning method for a virtual character.

Referring to FIG. 1, a flow chart of steps of a path planning method for a virtual character provided by an embodiment of the present disclosure is shown. In the embodiment of the present disclosure, the method includes the following steps 101-105:

In step 101: a start point and an end point of the virtual character in a game scene are acquired, and an initial path sequence connecting the start point and the end point is determined based on the game scene;

In step 102: a fitting curve is obtained by performing curve fitting on the initial path sequence;

In step 103: a sampling path sequence is obtained by sampling the fitting curve, where the sampling path sequence includes a plurality of sampling path points;

In step 104: a plurality of sub-path sequences for forming bends in the sampling path sequence are determined, where each sub-path sequence consists of turning path points forming a same bend; and In step 105: when a turning radius of the turning path point in the sub-path sequence is less than a preset first turning radius threshold, a path corresponding to the sub-path sequences in the fitting curve is updated by performing the curve fitting on the turning path points in the sub-path sequence again, and a target path sequence is obtained by sampling an updated fitting curve.

The embodiment of the present disclosure is implemented through the following steps: acquiring a start point and an end point of the virtual character in a game scene, and determining an initial path sequence connecting the start point and the end point based on the game scene; obtaining a fitting curve by performing curve fitting on the initial path sequence; obtaining a sampling path sequence by sampling the fitting curve, where the sampling path sequence includes a plurality of sampling path points; determining a plurality of sub-path sequences for forming bends in the sampling path sequence, where each sub-path sequence consists of turning path points forming a same bend; and when a turning radius of the turning path point in the sub-path sequence is less than a preset first turning radius threshold, updating a path corresponding to the sub-path sequences in the fitting curve by performing the curve fitting on the turning path points in the sub-path sequence again, and obtaining a target path sequence by sampling an updated fitting curve. The path points of the target path sequence generated by the embodiment of the present disclosure are smooth and uniform, so as to conveniently control the movement of the virtual character, and to be able to realize the smooth movement of the virtual character, which conforms to the movement law.

In the following, the path planning method for the virtual character in this exemplary embodiment will be further explained.

The virtual character in the embodiment of the present disclosure may be a virtual character controlled by AI. For example, the virtual character is a virtual carrier controlled by AI, which is machinery or equipment for transporting materials, people, etc., and may include a vehicle, a ship, etc.

In step 101, the start point and the end point of the virtual character in the game scene are obtained, and the initial path sequence connecting the start point and the end point is determined according to the game scene.

In a game application, the start point and the end point of the virtual character may be determined. The start point is generally a coordinate point of a current position of the virtual character in the game scene, and the end point is a target position that the virtual character needs to move to, which may be updated according to the game process.

The game scene may include a movable region for the virtual character and a non-movable region for the virtual character. For example, in a water scene, the virtual character is a ship, the movable region may be a water region, and the non-movable region may include a region corresponding to the reef, a region corresponding to the island, etc.

Based on the movable region in the game scene and the positions of the start point and the end point of the virtual character, an initial path sequence that only passes through the movable region from the start point to the end point may be determined, and the initial path sequence is generally the shortest path sequence among all paths that the virtual character passes through the movable region from the start point to the end point. The initial path sequence consists of a plurality of initial path points including the start point and the end point, and each initial path point includes a corresponding coordinate, which is used to indicate a specific position of the initial path point in the game scene.

In an embodiment of the present disclosure, the process of determining the initial path sequence connecting the start point and the end point based on the game scene may include:

generating a pathfinding grid model corresponding to the game scene; and determining, according to the pathfinding grid model, the initial path sequence from the start point to the end point by adopting a preset pathfinding algorithm.

In this embodiment, the game scene may be divided as a grid to obtain a pathfinding grid model, such that the data object with the same scene area uses fewer vertices, occupies less memory in the game, and the pathfinding algorithm is more efficient.

The pathfinding grid model is a form of graph. The basic definition of graph is in that: an expression of the graph is G=(V, E), where V represents a set of vertices, and E is in a binary relationship with V, and may be understood as an "edge". For example, there is an edge from vertex S to vertex T, then the edge E may be represented by (S, T).

For example, the Recast tool of the Recast & Detour pathfinding engine may be used to process the scene grid data of the game scene to obtain the above pathfinding grid model.

After the pathfinding grid model is obtained, the initial path sequence from the start point to the end point may be determined by a preset pathfinding algorithm, which may include A* algorithm (A-star algorithm), B* algorithm (B-star algorithm), greedy pathfinding algorithm, depth-first search algorithm, breadth-first search algorithm and so on.

The A* algorithm is a direct search method to solve the shortest path in a static road network. The closer an estimated distance in the A* algorithm is to an actual value, the faster the final search speed will be. The A* algorithm corresponds to a cost estimation function:

$$F(n)=G(n)+H(n)$$

F(n) is an estimated value of a minimum cost path from the start point to the end point through a node n, G(n) is an actual cost of a traveled path from the start point to the node n, H(n) is an estimated cost of a possible optimal path from the node n to the end point, and H(n) indicates the heuristic information used by the algorithm. According to F(n), a cost of a current node may be calculated, and a node that may be reached next time may be evaluated. The shortest path is found step by step by using the process of finding a point with the smallest cost value in each search and then continuing to search outside.

In an embodiment of the present disclosure, the Detour tool of the Recast & Detour pathfinding engine may be used to determine the initial path sequence from the start point to the end point.

In the process of determining the initial path sequence from the start point to the end point, the Detour tool adopts the A* algorithm and a funnel algorithm. That is, the inflection point in the path from the start point to the end point is found by the funnel algorithm, and the shortest path is determined by combining the A* algorithm.

Further, in order to ensure that the virtual character may move normally after processing the initial path sequence, in an embodiment of the present disclosure, the determining the initial path sequence from the start point to the end point by adopting a preset pathfinding algorithm, according to the pathfinding grid model includes:

determining an inflection point from the start point to the end point in the pathfinding grid model;

for each inflection point, when the inflection point is located at a boundary between a walkable region and a non-walkable region in the pathfinding grid model, moving the inflection point to the walkable region along an edge of the grid where the inflection point is located, so as to update the inflection point and obtain a corresponding updated inflection point; it should be noted that the updated inflection point is the original inflection point when the inflection point is not located at the boundary between the walkable region and the non-walkable region in the pathfinding grid model;

taking the start point, the updated inflection point and the end point as initial path points to obtain the initial path sequence.

In this embodiment, after the inflection point from the start point to the end point in the pathfinding grid model is determined by using the funnel algorithm, it is sequentially determined whether each inflection point is located at the boundary in the pathfinding grid model, and the boundary is an intersection line of the walkable region and the non-walkable region in the pathfinding grid model. If so, an inflection point optimization is performed on the inflection point at the boundary. A path sequence consisting of the start point, the optimized inflection point and the end point is the initial path sequence.

Specifically, the inflection point obtained by using the funnel algorithm must be located on an edge of the grid. The grid refers to a single grid that constitutes the pathfinding grid model. The process of inflection point optimization includes moving the inflection point along the edge of the grid where the inflection point is located to the walkable region, so as to update the original inflection point.

More specifically, the process of moving the inflection point along the edge of the grid where the inflection point is located to the walkable region, includes the following.

When a length of the edge of the grid where the inflection point is located is greater than or equal to a preset length, the inflection point is moved a first distance to the walkable region along the edge of the grid where the inflection point is located, and the original inflection point before moving is replaced with the moved inflection point, so as to update the original inflection point. The preset length and the first distance may be set according to actual needs. For example, the preset length may be the maximum width of the virtual character, and the first distance may be half of the maximum width of the virtual character. For example, when the virtual character is an automobile, the preset length may be equal to the maximum width of the automobile, and the first distance may be equal to half of the maximum width of the automobile.

When the length of the edge of the grid where the inflection point is located is less than the preset length, the inflection point is moved a second distance to the walkable region along the edge of the grid where the inflection point is located, and the original inflection point before moving is replaced with the moved inflection point, so as to update the original inflection point. The second distance may be related to a total length of the edge of the grid where the inflection point is located. For example, the second distance may be half of the edge of the grid where the inflection point is located, or ⅓ of the edge of the grid where the inflection point is located.

Figure 2:
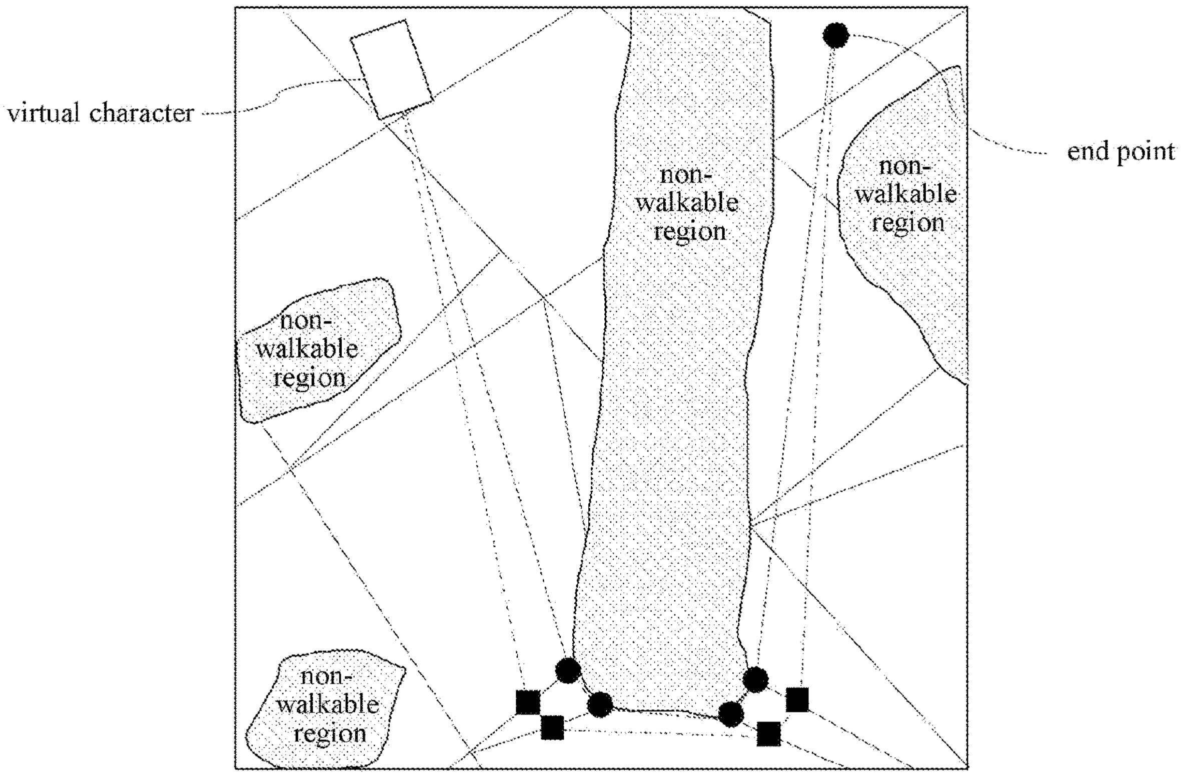
FIG. 2 is a schematic diagram of an inflection point optimization in one or more embodiment of the present disclosure.

FIG. 2 is a schematic diagram of an inflection point optimization in an embodiment of the present disclosure. As shown in FIG. 2, dots represent original inflection points and square points represent moved inflection points. Through the inflection point optimization, it may prevent the virtual character from colliding with obstacles (such as rocks) in the game scene when the virtual character moves in a target path obtained by subsequent processing.

In step 102, a fitting curve is obtained by performing curve fitting on the initial path sequence.

In this embodiment, various curve fitting algorithms may be adopted to perform the curve fitting on the initial path sequence, so as to obtain the fitting curve. For example, Bezier curve fitting method may be adopted to perform curve fitting on the initial path sequence, and B-spline curve fitting method may also be adopted to perform curve fitting on the initial path sequence.

In an embodiment of the present disclosure, the process of obtaining the fitting curve by performing the curve fitting on the initial path sequence may include:

taking the initial path points in the initial path sequence as control points to construct a cubic Hermite curve, so as to obtain the fitting curve.

The initial path point is the path point that constitutes the initial path sequence. The Hermite curve is a curve determined by known coordinates of two endpoints and tangent lines at the endpoints. In this embodiment, the initial path point is taken as the control point, and curve fitting is performed on the initial path sequence by using the cubic Hermite curve, which may ensure that the obtained fitting curve passes through all the initial path points in the initial path sequence. It may be understood that in the process of curve fitting in the embodiment of the present disclosure, starting from the start point, two adjacent initial path points are taken as two endpoints of the cubic Hermite curve fitting in sequence, and a plurality of connected curves, that is, fitting curves, are obtained.

For example, a formula of the cubic Hermite curve is given by:

$$P(t)=(2t^3-3t^2+1)P_0+(t^3-2t^2+t)R_0+(t^3-t^2)R_1+(-2t^3+3t^2)P_1$$

A value of t is between 0 and 1, and a coordinate value of any point on the curve is a function of t. When the cubic Hermite curve fitting is performed, the value of t may be determined according to the number of initial path points in the initial path sequence. $P_0$ and $P_1$ respectively represent the coordinates of the two known endpoints, and $R_0$ and $R_1$ respectively represent the tangents of the two known endpoints.

In the calculation process, a Hermite matrix is given by:

$$M_h=\begin{bmatrix} 2 & -2 & 1 & 1 \\ -3 & 3 & -2 & -1 \\ 0 & 0 & 1 & 0 \\ 1 & 0 & 0 & 0 \end{bmatrix}$$

A geometric vector of the Hermite is given by:

$$G_h=[P_0\ \ P_1\ \ R_0\ \ R_1]^T$$

T is a vector about t, which may be given by:

$$T=[t^3,t^2,t,1]$$

A point on the Hermite curve may be given by:

$$Q(t)=T*M_h*G_h,$$
$$t\in[0,1]$$

In step 103, a sampling path sequence is obtained by sampling the fitting curve, and the sampling path sequence includes a plurality of sampling path points.

In this embodiment, after the fitting curve is obtained, the fitting curve may be sampled to obtain a plurality of sampling path points, and a sampling path sequence is formed by the obtained plurality of sampling path points. Each sampling path point carries the corresponding sampling path point coordinate and the corresponding tangent direction.

The number of sampling path points for sampling the fitting curve may be preset according to the requirement. For example, a relationship between a length of the fitting curve and the number of sampling path points may be preset. After the fitting curve is obtained, the number of sampling path points may be determined according to the relationship between the length of the fitting curve and the number of sampling path points, and the fitting curve may be sampled with equal length or randomly based on the determined number of sampling path points. For another example, the number of sampling path points may be preset, and after the fitting curve is obtained, the fitting curve may be sampled with the equal length or randomly according to the preset number of sampling path points.

For example, in the process of sampling the fitting curve with equal length, the Gauss-Legendre quadrature formula is firstly used to determine a length S of the curve, and the number of equal divisions of the fitting curve is determined according to the actual requirement. For example, if it is required to divide the curve into n equal parts, a length of each part is S/n, that is, n values of t are needed to be determined, such that a length of the curve between any two $t_i$ and $t_{i+1}$ is S/n. The Newton tangent method may be used to determine a value of t. The number of equal divisions of the curve may be determined according to the curve length and sampling length, for example, the number of equal divisions of the curve=curve length/sampling length. The sampling length is generally related to a size of the virtual character. For example, when the virtual character is a ship, its length is 5 meters and the curve length is 20 meters, the sampling length may be 5 meters or 10 meters.

In the process of solving, it may be assumed that a function of the length with respect to t is S=Y(t), the derivative of t is performed on two sides of the equation, that is, $$\frac{dS}{dt}=\frac{dY(T)}{dt}.$$

By introducing the differential ds of length, the equation is rewritten as $$\frac{dS}{ds}*\frac{ds}{dt}=\frac{dY(T)}{dt},$$

and

-continued $$\frac{dS}{ds} = 1,$$

so $$\frac{ds}{dt} = \frac{dY(T)}{dt} \cdot \frac{dY(T)}{dt}$$

is the derivative of the length with respect to t, which is listed above. This equation is performed integration with respect to t, to obtain the following equation:

$$s = g(t) = \int_0^t \left| \frac{dY(\tau)}{dt} \right| d\tau$$

Where, s is known, and t is found to satisfy the equation. For the right side of the above equation, the Newton tangent method is used to approximate a solution. A function F(t)=g(t)−s is set. An approximate solution may be obtained by iterating the following equation and stopping after reaching a certain precision:

$$t_{i+1} = t_i - \frac{F(t_i)}{F'(t_i)},$$

$$i \geq 0$$

After getting n values of t, we may sample with equal length on the Hermite curve.

Figure 3:
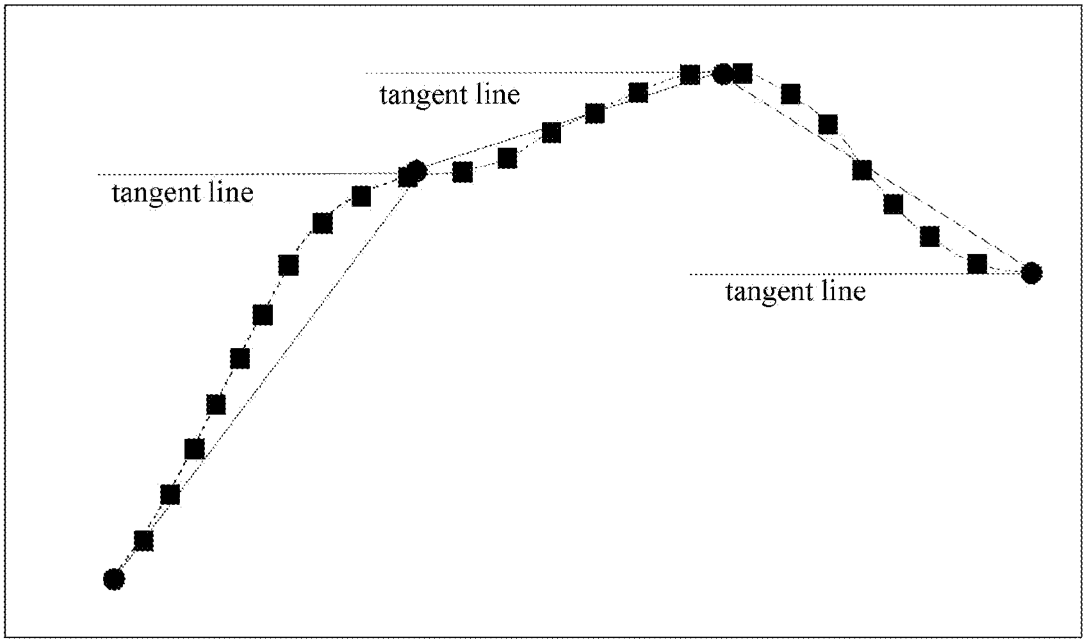
FIG. 3 is a schematic diagram of cubic Hermite curve fitting and sampling in one or more embodiment of the present disclosure.

FIG. 3 is a schematic diagram of cubic Hermite curve fitting and sampling in the embodiment of the present disclosure, where the points are control points and the square points are sampling path points for equal-length sampling. As shown in FIG. 3, the fitting curve obtained by the cubic Hermite curve fitting is smoother than a path formed by connecting the initial path points, and it is more convenient to control the movement of the virtual character by sampling the path points with the equal length.

In step 104, the sub-path sequences for forming bends in the sampling path sequence are determined, and the sub-path sequence consists of turning path points that form the same bend.

In order to prevent a curvature of the bend in the path obtained by the path planning from being too large, which may cause the virtual character cannot move normally along the planned path, in this embodiment, after obtaining the sampling path sequence, it is necessary to identify the sub-path sequences used to form the bends in the sampling path sequence.

In some embodiments, the process of determining the sub-path sequences for forming the bends in the sampling path sequence may include:

- sequentially calculating a tangent-line included angle between tangent vectors of two adjacent sampling path points in the sampling path sequence;
- determining two sampling path points with the tangent-line included angle greater than a preset first included angle threshold as the turning path points; and
- determining a plurality of adjacent turning path points as the sub-path sequence.

Since the sampling path points are points on the fitting curve, a tangent vector of each sampling path point may be determined according to the fitting curve, and then an included angle between tangent vectors of two adjacent sampling path points, i.e., the tangent-line included angle may be determined. Specifically, each sampling path point may be traversed from the initial sampling path point in the sampling path sequence, and if there is a subsequent sampling path point in the current traversing sampling path point, the tangent-line included angle of the current traversing sampling path point and its adjacent subsequent sampling path point may be calculated.

When the tangent-line included angle is not equal to 0, it means that the two adjacent sampling path points are located in the bend.

In general, only when a curvature of the bend is large, the normal movement of the virtual character is affected. Thus, in this embodiment, the sampling path points with the tangent-line included angle greater than the preset included angle threshold are determined as the turning path points, for example, the preset first included angle threshold may be 20 degrees. In this way, a plurality of turning path points may be determined, and at least one sub-path sequence may be obtained from the plurality of turning path points according to whether they are adjacent or not, and the turning path points in each sub-path sequence are continuous, that is, each sub-path sequence consists of a plurality of turning path points forming the same bend.

In step 105, when a turning radius of the turning path point in the sub-path sequence is less than a preset first turning radius threshold, a path corresponding to the sub-path sequences in the fitting curve is updated by performing the curve fitting on the turning path points in the sub-path sequence again, and a target path sequence is obtained by sampling an updated fitting curve.

After obtaining the sub-path sequence, the turning radius corresponding to each turning path point in each sub-path sequence may be further calculated. In the process of calculating the turning path of each turning path point, when there are two adjacent turning path points before and after the current turning path point, a radius of a circle formed by the current turning path point and a previous turning path point, and a radius of a circle formed by the current turning path point and a next turning path point are calculated respectively, and a smaller radius of the two is taken as a turning radius of the current turning path point. The previous turning path point and the next turning path point are assigned according to a path direction, and the path direction refers to a direction from the start point of the virtual character to the end point of the virtual character along the fitting curve.

For example, for each sub-path sequence, a circle may be determined from the first turning path point of the sub-path sequence, according to the position of the first turning path point, the position of the second turning path point adjacent to the first turning path point, and the tangent line of the first turning path point, and a radius of the circle may be determined as a radius of the first turning path point. For the second turning path point, a circle may be determined according to the position of the first turning path point, the position of the second turning path point and the tangent line of the second turning path point, and a radius of the circle may be obtained and denoted as a first optional radius. If there is a third turning path point adjacent to the second turning path point, a circle is determined according to the position of the second turning path point, the position of the third turning path point and the tangent line of the second turning path point, and a radius of the circle is obtained and denoted as a second optional radius. The radius with less value is determined as the turning radius of the second turning path point by comparing the values of the first optional radius and the second optional radius. If there is no third turning path point adjacent to the second turning path point, the first optional radius is determined as the turning radius of the second turning path point.

After calculating the turning radius of each turning path point in each sub-path sequence, a relationship between the turning radius of each turning path point and a preset first turning radius threshold may be determined. The preset first turning radius threshold is at least greater than the minimum turning radius of the virtual character, and in some embodiments, the preset first turning radius threshold may be equal to twice the minimum turning radius of the virtual character. When that turning radius of at least one turning path point in the sub-path sequence is less than a preset first turning radius threshold, the curve fitting is performed on the turning path in the sub-path sequence again. In order to facilitate the distinction, the sub-path sequence with the turning radius of the turning path point less than the preset first turning radius threshold is determined as the target sub-path sequence, the curve fitting is performed on the target sub-path sequence again, and a new fitting curve obtained by re-fitting replaces the corresponding sub-path sequence curve. The process of performing the curve fitting again may refer to the previous description of step 102, which is not repeated here.

Similarly, all the sub-path sequences that need to be curve-fitted again may be determined, and the determined sub-path sequences that need to be curve-fitted again may be curve-fitted to obtain a new fitting curve, and a new fitting curve may replace the corresponding sub-path sequence curve and be merged with the original path sequence that is replaced in the sampling path sequence to obtain a new sampling path sequence. The new sampling path sequence is sampled to obtain the target path sequence. The sampling process may refer to the description of step 103 above, and will not be repeated here. It should be noted that when equal-length sampling is used for both samples, the sampling lengths of the two equal-length sampling may be the same or different.

In some embodiments, after obtaining the target path sequence, it may return to the above step 103 to continue until there is no path point with the turning radius less than the preset first turning radius threshold in the target path sequence.

Further, in order to improve the smoothness of the second fitting curve obtained after performing curve fitting again, in an embodiment of the present disclosure, when a turning radius of the turning path point in the sub-path sequence is less than a preset first turning radius threshold, performing the curve fitting on the turning path points in the sub-path sequence again, includes:

- determining the sub-path sequence having the turning path point with the turning radius less than the preset first turning radius threshold as a target sub-path sequence; and
- when a number of spaced sampling path points between two adjacent target sub-path sequences is less than a preset spaced number threshold, obtaining a new target sub-path sequence by merging the turning path points in the two adjacent target sub-path sequences and the spaced sampling path points, where the preset interval number may be selected according to an actual requirement, and in some embodiments, the preset interval number may be 3.

In this embodiment, the closely spaced target sub-path sequence that needs to be curve fitted again is merged with the spaced sampling path points to obtain a longer target sub-path sequence that needs to be curve fitted again, and then the curve fitting is performed on the target sub-path sequence.

The embodiment of the present disclosure is implemented through the following steps: acquiring a start point and an end point of the virtual character in a game scene, and determining an initial path sequence connecting the start point and the end point based on the game scene; obtaining a fitting curve by performing curve fitting on the initial path sequence; sampling the fitting curve with equal length to obtain a sampling path sequence, where the sampling path sequence includes a plurality of sampling path points; determining a plurality of sub-path sequences for forming bends in the sampling path sequence, where each sub-path sequence consists of turning path points forming a same bend. When there is a turning path point of which the turning radius is less than the preset first turning radius threshold in the sub-path sequence, curve fitting is performed on the turning path points in the sub-path sequence again, and then an equal-length sampling is performed to obtain a target path sequence. The path points of the target path sequence generated by the embodiment of the present disclosure are smooth and uniform, which is convenient to control the movement of the virtual character, and may realize the smooth movement of the virtual character, which conforms to the movement law.

Further, in an embodiment of the present disclosure, the target path sequence consists of a plurality of target path points, and after obtaining the target path sequence, the path planning method for the virtual character may further include:

- determining a target path point with a turning radius less than a preset second turning radius threshold in the target path sequence, and determining the target path point with the turning radius less than the preset second turning radius threshold as a curvature to-be-improved path point, where the preset second turning radius threshold is less than the preset first turning radius threshold;
- determining a plurality of adjacent curvature to-be-improved path points as a curvature to-be-improved path sequence;
- for each curvature to-be-improved path sequence, determining a minimum turning radius circle corresponding to the curvature to-be-improved path sequence; and
- determining a mapping point of the curvature to-be-improved path point in the curvature to-be-improved path sequence on a circumference of the minimum turning radius circle, and updating the corresponding curvature to-be-improved path point by the mapping point.

Through the above steps 101 to 105, a smooth path (i.e., the target path) from the start point to the end point may be obtained. The target path consists of a plurality of target path points with equal intervals. If one of the target path points is in a turning sub-sequence (a sequence consisting of target path point with a turning radius less than the preset second turning radius threshold), the target path point and its adjacent target path point form the turning radius of the bend.

By traversing the target path sequence, the turning radius of the target path point is compared with the preset second turning radius threshold. The preset second turning radius threshold may be the minimum turning radius of the virtual character. If the turning radius of the target path point is less than the minimum turning radius of the virtual character, it is likely that the movement requirement of the virtual character cannot be met because the virtual character has specific kinematic constraints. The kinematics constraints may specifically include a minimum turning radius constraint and a turning speed constraint. It means that this target path point needs a curvature improvement, and the target path point that needs the curvature improvement is determined as the curvature to-be-improved path point. In the same way, all the target path points that need the curvature improvement may be obtained, that is, all the curvature to-be-improved path points may be obtained.

The sequence consisting of adjacent curvature to-be-improved path points is determined as the curvature to-be-improved path sequence, and one or more curvature path sequences to be improved may be obtained. Of course, if there is no curvature to-be-improved path point, accordingly, there is no curvature to-be-improved path sequence.

For each curvature to-be-improved path sequence, starting from the first curvature to-be-improved path point in the path sequence, two adjacent curvature to-be-improved path points are taken as a group, and two center points are determined according to the positions and tangent directions of the two adjacent curvature to-be-improved path points, thereby a plurality of center points of the curvature to-be-improved path sequence being determined. Then coordinate centers of the plurality of center points are calculated, that is, an average of the abscissas of the plurality of center points is taken as the abscissas of the center point of the curvature to-be-improved path sequence, and an average of the ordinate of the plurality of center points is taken as the ordinate of the curvature to-be-improved path sequence.

After the position of the center point of the curvature to-be-improved path sequence is determined, the minimum turning radius circle corresponding to the curvature to-be-improved path sequence is generated by taking the minimum turning radius of the virtual character as the radius, and all the curvature to-be-improved path points in the curvature to-be-improved path sequence located within the minimum turning radius circle are mapped to a circumference of the minimum turning radius circle. Specifically, the center point of the minimum turning radius circle and the curvature to-be-improved path point in the minimum turning radius circle may be connected, and the connecting line may be extended to intersect with the circumference of the minimum turning radius circle, and the obtained intersection point is the mapping point corresponding to the curvature to-be-improved path point, so as to replace the original curvature to-be-improved path point.

In some embodiments, after the mapping points of each path point to be improved in the minimum turning radius circle are obtained, the arc length between two adjacent mapping points is calculated. If the arc length exceeds the preset length threshold, the two adjacent mapping points are interpolated. The preset length threshold may be a length of two adjacent target path points in the target path. The process of interpolation may be to add at least one mapping point between two adjacent mapping points.

For example, after the arc length is obtained, a ratio of the arc length to the preset length threshold may be calculated, and the obtained ratio is rounded down to determine the number of mapping points that need to be increased, and then the mapping points are added to the arc length, such that central angles of each two adjacent mapping points in the arc length are equal. By interpolation, a distance between adjacent path points being too large may be avoided.

Further, in an embodiment of the present disclosure, after the mapping points (including the mapping points corresponding to each path point to be improved and/or the mapping points for interpolating the mapping points with arc length exceeding the path sampling length) on the minimum turning radius circle are obtained, in order to enable the mapping points on the minimum turning radius circle to access to the target path more smoothly, the target path sequence includes another target path points in addition to the curvature to-be-improved path points. The method may further include:

- sequentially calculating a transition fitting curve obtained by performing the curve fitting on the another target path points and the mapping points, in an ascending order of distances between the another target path points and the minimum turning radius circle; and
- when the transition fitting curve meeting a preset condition, splicing the mapping points with the another target path points in the target path sequence, to update the target path sequence.

In this embodiment, for each mapping point of the minimum turning radius circle, there is at least a pre-waypoint sub-sequence (that is, a waypoint sub-sequence in a direction from the start point to the curvature to-be-improved path sequence) before the curvature to-be-improved path sequence corresponding to the minimum turning radius circle or a post-path sub-sequence (that is, a waypoint sub-sequence in a direction from the curvature path sequence to the end point) after the curvature to-be-improved path sequence corresponding to the minimum turning radius circle in the original target path. In the process of splicing the mapping points of the minimum turning radius circle with its corresponding pre-path sub-sequence and/or post-path sub-sequence, curve fitting is performed on the another target path points and mapping points in sequence from near to far to obtain the transition fitting curve. When the transition fitting curve meets the preset condition, the transition fitting curve is used to splice the mapping points with the another target path points corresponding to the transition fitting curve, so as to realize splicing the mapping point with its pre-path sub-sequence and/or post-path sub-sequence.

For example, for the pre-path sub-sequence of the mapping point, starting from the another target path point closest to the mapping point in the pre-path sub-sequence, for the convenience of description, the another target path point closest to the minimum turning radius circle is determined as the first another target path point, and the first another target path point is curve-fitted with all mapping points on the minimum turning radius circle to obtain a first transition fitting curve. Then the first transition fitting curve is sampled to determine whether the sampled first transition fitting curve meets the turning constraint of the virtual character, that is, whether the turning radius of each path point on the sampled first transition fitting curve is greater than the minimum turning radius of the virtual character, if so, it means that the first transition fitting curve meets the preset requirement, and the first transition fitting curve, the mapping point sequence connected with the first transition fitting curve and the pre-path sub-sequence form a new target path together.

If the first transition fitting curve obtained by the first another target path point does not meet the preset requirement, a second another target path point adjacent to the first another target path point in the pre-path sub-sequence is acquired. A distance between the second another target path point and the mapping point starting in the minimum turning radius circle is greater than a distance between the first another target path point and the starting mapping point, the second another target path point is curve-fitted with all mapping points on the minimum turning radius circle to obtain a second transition fitting curve. Then, the second transition fitting curve is sampled to determine whether the sampled second transition fitting curve meets the turning constraint of the virtual character. If so, it means that the second transition fitting curve meets the preset requirement, and the second transition curve, the mapping point sequence connected with the second transition curve and the pre-path sub-sequence (the pre-path sub-sequence does not include the first another target path point) form a new target path together.

Similarly, the post-path sub-sequence may be processed to obtain a transition fitting curve of the post-path sub-sequence and the mapping point sequence.

Figure 4:
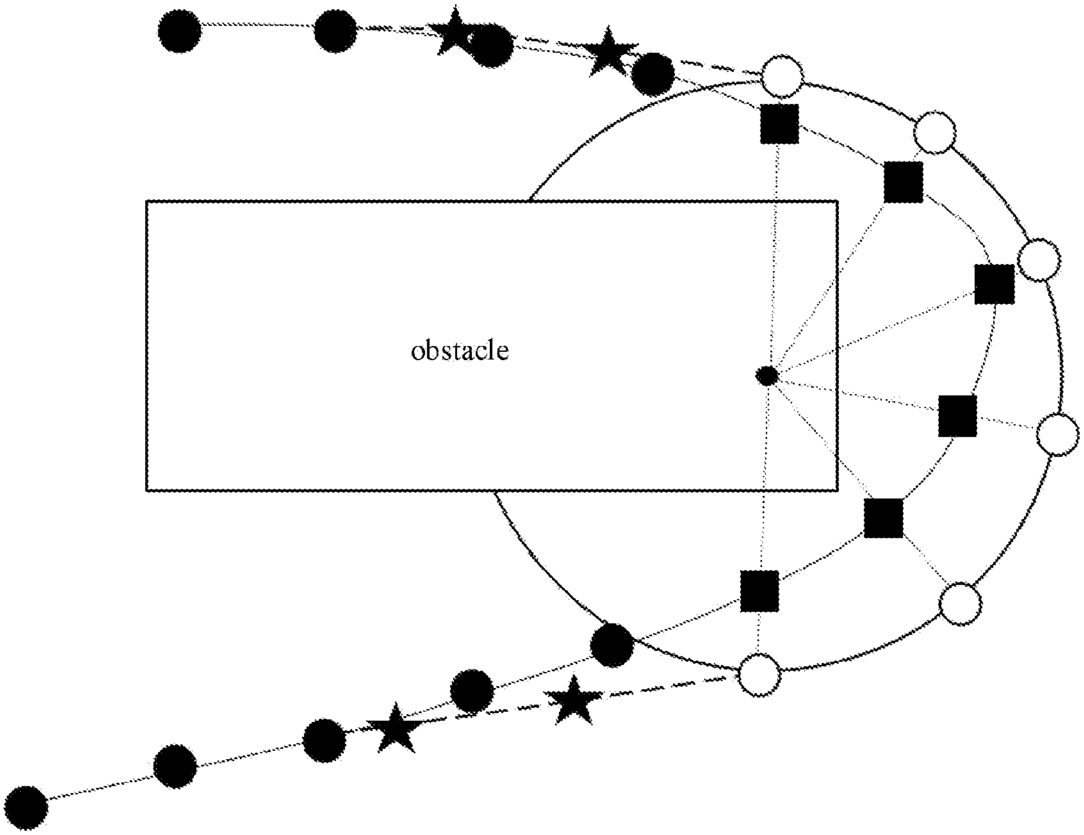
FIG. 4 is a schematic diagram of a curvature improvement in one or more embodiment of the present disclosure.

FIG. 4 is a schematic diagram of curvature improvement in an embodiment of the present disclosure. As shown in FIG. 4, square points represents a path with excessive curvature, that is, a square point is a curvature to-be-improved path point, and a hollow dot is a mapping point; a solid point is another target path point in addition to the square point in the original target path, and a star point is a transition path point where the mapping point on the minimum turning radius circle is spliced with the original target path.

Further, in an embodiment of the present disclosure, in order to solve the starting problem of the virtual character, the path planning method for the virtual character further includes:

- determining two minimum turning circles for the virtual character according to the start point, an orientation and a minimum turning radius of the virtual character;
- determining a target minimum turning circle corresponding to a starting mode according to the starting mode of the virtual character, where the starting mode includes forward-left turn, forward-right turn, backward-left turn and backward-right turn;
- determining a transition path sequence corresponding to each starting mode according to the target minimum turning circle and a first target path point firstly located outside the target minimum turning circle in the target path sequence;
- determining a target transition path sequence from the transition path sequence; and
- processing the target path sequence according to the target transition path sequence to obtain a processed target path sequence.

In the process of starting adjustment in this embodiment, the start point of the virtual character (that is, the position of the virtual character) is taken as a point on the minimum turning circle, the orientation of the virtual character is taken as the tangent line of the minimum turning circle, and the minimum turning radius of the virtual character is taken as the radius of the minimum turning circle, such that two tangent circles may be generated. The two tangent circles are minimum turning circles of the virtual character, which may ensure that the virtual character may move along the arc, thus achieving the purpose of adjusting the direction.

The virtual character may have four starting modes, that is, forward-left turn, forward-right turn, backward-left turn and backward-right turn, and the minimum turning circles corresponding to different starting modes may be different. For example, the target minimum turning circle corresponding to two starting modes, the forward-left turn and the forward-right turn, are different, while the target minimum turning circle corresponding to two starting modes, the forward-left turn and the backward-left turn, are the same. After the starting mode of the virtual character is determined, the target minimum turning circle corresponding to the starting mode may be determined.

According to the target turning circle and the first target path point firstly located outside the target minimum turning circle in the target path sequence, the transition path sequence corresponding to each starting mode is determined.

After the transition path sequence corresponding to each starting mode is obtained, the feasible and shortest transition path sequence is selected as the target transition path sequence from the obtained transition path sequences. The feasible transition path sequence refers to the transition path sequence whose curvature satisfies a motion constraint (that is, the curvature is greater than or equal to the minimum turning curvature of the virtual character), and waypoints of the transition path sequence are all in the walkable region.

Finally, the target path sequence is processed by using the target transition path sequence to obtain the processed target path sequence, which solves the transition problem of the starting of the virtual character and ensures that the virtual character may start smoothly.

The process of determining the transition path sequence corresponding to each starting mode according to the target minimum turning circle and a first target path point firstly located outside the target minimum turning circle in the target path sequence may specifically include the following steps:

- sampling the target minimum turning circle to obtain a turning circle waypoint;
- determining whether the turning circle waypoint is located in a walkable region of the game scene;
- if not, not obtaining a transition path corresponding to the starting mode;
- if so, determining the first target path point firstly located outside the target turning minimum circle in the target path sequence, and determining a target turning circle waypoint in a reverse direction of a path corresponding to the starting mode and closest to the first target path point in the target minimum turning circle;
- calculating a turning-tangent-line included angle between tangent lines of the first target path point and the target turning circle waypoint;
- if the turning-tangent-line included angle is less than a preset second included angle threshold, acquiring a turning circle waypoint between the target turning circle waypoint and the start point as a to-be-fit turning circle waypoint;
- performing the curve fitting on the to-be-fit turning circle waypoint and the first target path point to obtain a transition path curve; and
- sampling the transition path curve to obtain a transition path sequence.

Figure 5:
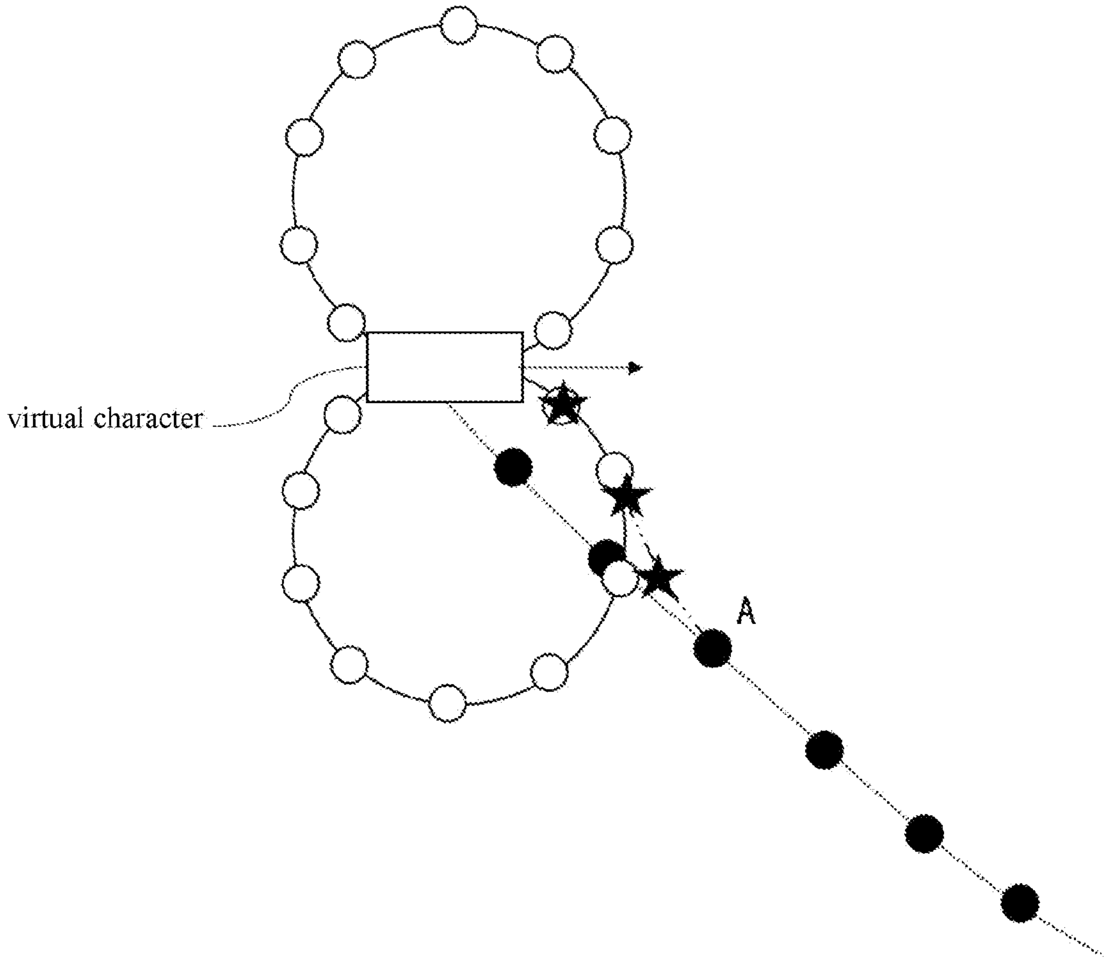
FIG. 5 is a schematic diagram of starting transition in one or more embodiment of the present disclosure.

For example, please refer to FIG. 5, FIG. 5 shows the starting transition diagram of the embodiment of the present disclosure, taking the forward-right turn as an example, since it is a right turn, the target minimum turning circle is a turning circle below. The target turning circle is sampled to obtain the turning circle waypoints (as shown by the hollow points in FIG. 5). Preferably, the target turning circle may be sampled with equal length to obtain the turning circle waypoints. First, a first path point outside the target turning circle in the target path (such as the curve formed by the solid dots sequence in FIG. 5, and the target path sequence may be the target path sequence obtained by curve fitting or the target path sequence obtained by curve fitting and curvature improvement) is found, which is denoted as A, then the turning circle waypoints on the target minimum turning circle are traversed, and calculated by using the following steps.

it is determined whether the turning circle waypoint on the target minimum turning circle is in the walkable region of the game scene. If not, it means that due to obstacles and other reasons, a legal transition path sequence cannot be obtained through the starting mode of forward-right turn. In some embodiments, combined with the starting mode, it may be determined whether the turning circle waypoint from the start point to the intersection between the target minimum turning circle radius and the route corresponding to the target path sequence on the target minimum turning circle along a path direction corresponding to the starting mode is in the walkable region of the game scene.

If the turning circle waypoint is located in the walkable region, an included angle between the tangent line of the turning circle waypoint on the target minimum turning circle and the tangent line of point A is calculated, and when the value of the included angle is less than a threshold (e.g., less than 45 degrees), it indicates that curve fitting is feasible. Specifically, the included angle between the tangent line of the turning circle waypoint and the tangent line of point A may be calculated, the the turning circle waypoint is located between the start point and the intersection of the target minimum turning circle radius and the route corresponding to the target path sequence on the target minimum turning circle along a path direction corresponding to the starting mode.

In a forward direction, a one-to-one curve fitting is performed on this turning circle waypoint and the target path sequence starting from point A, to check whether a legal transition path sequence may be obtained, including that the curvature satisfies the motion constraint (that is, the curvature is greater than or equal to the minimum turning curvature of the virtual character), and all the waypoints of the transition path sequence are in the walkable region, etc. If so, the path formed by the transition path sequence is determined as the transition path of the starting mode of the forward-right turn. As shown in FIG. 5, the star points represent the transition path points in the transition path sequence, and the long dash-dotted line represents the transition path.

If legal transition path sequences may be obtained corresponding to the plurality of starting modes, a transition path sequence with the shortest path is selected as the target transition path sequence. The target path sequence is processed by using the target transition path sequence to obtain the processed target path sequence, which is the final path sequence of the virtual character.

In the embodiment of the present disclosure, the path may be smoothed by performing curve fitting on the path sequence with cubic Hermite curve. By sampling the fitting curve with equal length, the waypoint sequence may be uniform. By using the minimum turning radius of the virtual character to correct the curvature, the curvature of the path may be reduced, such that the path point sequence may meet the kinematic constraint of the virtual character. The minimum turning radius circle is used to adjust the starting, such that the virtual character may start smoothly. The defects of path planning in related art are improved, and a global optimal path satisfying the kinematic constraint is obtained, such that various kinds of carriers may use a movement control algorithm to track forward and obtain a smooth and excellent movement performance in the game.

It should be noted that for the sake of simple description, the method embodiments are all expressed as a series of action combinations. However, those skilled in the art should know that the embodiments of the present disclosure are not limited by the described action sequence, because according to the disclosed embodiments, certain steps may be performed in other sequences or at the same time. Secondly, those skilled in the art should also know that the embodiments described in the specification are all preferred embodiments, and the actions involved are not necessarily necessary for the embodiments of the present disclosure.

Figure 6:
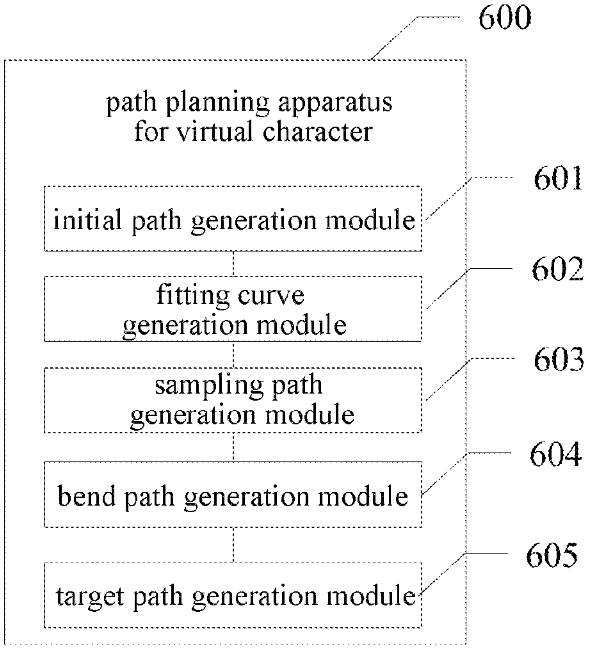
FIG. 6 is a structural block diagram of a path planning apparatus for a virtual character in one or more embodiment of the present disclosure.

Referring to FIG. 6, a structural block diagram of an embodiment of a path planning apparatus 600 for a virtual character of the present disclosure is shown. In the embodiment of the present disclosure, the path planning apparatus for the virtual character may include the following modules:

an initial path generation module 601, configured to acquire a start point and an end point of the virtual character in a game scene, and determine an initial path sequence connecting the start point and the end point based on the game scene;

a fitting curve generation module 602, configured to obtain a fitting curve by performing curve fitting on the initial path sequence;

a sampling path generation module 603, configured to obtain a sampling path sequence by sampling the fitting curve, where the sampling path sequence includes a plurality of sampling path points;

a bend path generation module 604, configured to determine a plurality of sub-path sequences for forming bends in the sampling path sequence, where each sub-path sequence consists of turning path points forming a same bend; and a target path generation module 605, configured to perform the curve fitting on the turning path points in the sub-path sequence again when a turning radius of the turning path point in the sub-path sequence is less than a preset first turning radius threshold, and then perform sampling to obtain a target path sequence.

In some embodiments, the initial path generation module 601 includes:

a pathfinding grid model generation module, configured to generate a pathfinding grid model corresponding to the game scene; and an initial path generation module based on a network model, configured to determine the initial path sequence from the start point to the end point by adopting a preset pathfinding algorithm according to the pathfinding grid model.

In some embodiments, the initial path generation module based on a network model includes:

an inflection point determination module, configured to determine an inflection point from the start point to the end point in the pathfinding grid model;

an inflection point optimization module, configured to, for each inflection point, move the inflection point to a walkable region along an edge of the grid where the inflection point is located when the inflection point is located at a boundary between the walkable region and a non-walkable region in the pathfinding grid model, so as to update the inflection point and obtain a corresponding updated inflection point; and an initial path generation module based on an optimized inflection point, configured to take the start point, the updated inflection point and the end point as initial path points to obtain the initial path sequence.

In some embodiments, the fitting curve generation module 602 is configured to take the initial path points in the initial path sequence as control points to construct a cubic Hermite curve, so as to obtain the fitting curve.

In some embodiments, the sampling path generation module 603 includes:

a sampling path point included angle calculation module, configured to sequentially calculate a tangent-line included angle between tangent vectors of two adjacent sampling path points in the sampling path sequence;

a turning path point generation module, configured to determine two sampling path points with the tangent-line included angle greater than a preset first included angle threshold as the turning path points; and a bend path determination module, configured to determine a plurality of adjacent turning path points as the sub-path sequence.

In some embodiments, the target path generation module includes:

a secondary fitting path determination module, configured to determine a sub-path sequence having the turning path point with the turning radius less than the preset first turning radius threshold as a target sub-path sequence; and a first target path updating module, configured to obtain a new target sub-path sequence by merging the turning path points in the two adjacent target sub-path sequences and the spaced sampling path points when a number of spaced sampling path points between two adjacent target sub-path sequences is less than a preset spaced number threshold.

In some embodiments, the target path sequence consists of a plurality of target path points, and the apparatus includes:

a curvature to-be-improved path point determination module, configured to determine a target path point with a turning radius less than a preset second turning radius threshold in the target path sequence, and determine the target path point with the turning radius less than the preset second turning radius threshold as a curvature to-be-improved path point, where the preset second turning radius threshold is less than the preset first turning radius threshold;

the curvature to-be-improved path point determination module, configured to determine a plurality of adjacent curvature to-be-improved path points as a curvature to-be-improved path sequence;

a minimum turning radius circle determination module, configured to, for each curvature to-be-improved path sequence, determine a minimum turning radius circle corresponding to the curvature to-be-improved path sequence; and a curvature to-be-improved path point updating module, configured to determine a mapping point of the curvature to-be-improved path point in the curvature to-be-improved path sequence on a circumference of the minimum turning radius circle, and update the corresponding curvature to-be-improved path point by using the mapping point.

In some embodiments, the apparatus includes:

a mapping point interpolation module, configured to add at least one mapping point between the two adjacent mapping points when an arc length between two adjacent mapping points on the minimum turning radius circle is greater than a preset length threshold.

In some embodiments, the target path sequence includes another target path points in addition to the curvature to-be-improved path point, and the apparatus further includes:

a transition fitting curve determination module, configured to sequentially calculate a transition fitting curve obtained by performing the curve fitting on the another target path points and the mapping points, according to a sequence from near to far with respect to the minimum turning radius circle; and a second target path updating module, configured to, when the transition fitting curve meeting a preset condition, splice the mapping points with the another target path points in the target path sequence to update the target path sequence.

In some embodiments, the apparatus further includes:

a minimum turning circle determination module, configured to determine two minimum turning circles for the virtual character according to the start point, an orientation and a minimum turning radius of the virtual character;

a target minimum turning circle determination module, configured to determine a target minimum turning circle corresponding to a starting mode according to the starting mode of the virtual character, where the starting mode includes forward-left turn, forward-right turn, backward-left turn and backward-right turn;

a transition path sequence determination module, configured to determine a transition path sequence corresponding to each starting mode according to the target minimum turning circle and a first target path point firstly located outside the target minimum turning circle in the target path sequence;

a target transition path sequence determination module, configured to determine a target transition path sequence from the transition path sequence; and a third target path sequence updating module, configured to process the target path sequence according to the target transition path sequence to obtain a processed target path sequence.

In some embodiments, the transition path sequence determination module includes:

a turning circle waypoint determination module, configured to sample the target minimum turning circle to obtain a turning circle waypoint;

a turning circle waypoint determining module, configured to determine whether the turning circle waypoint is located in a walkable region of the game scene;

a target turning circle waypoint determination module, configured to, if so, determine the first target path point firstly located outside the target turning circle in the target path sequence, and determine a target turning circle waypoint in the target minimum turning circle, where the target turning circle waypoint is a turning circle waypoint closest to the first target path point in a reverse direction of a path corresponding to the starting mode in the target minimum turning circle;

a calculation module for a turning-tangent-line included angle, configured to calculate a turning-tangent-line included angle between tangent lines of the first target path point and the target turning circle waypoint;

a to-be-fit turning circle waypoint determination module, configured to acquire a turning circle waypoint between the target turning circle waypoint and the start point as a to-be-fit turning circle waypoint, if the included angle between turning tangent lines is less than a preset second included angle threshold;

a determination module for a transition path curve based on the to-be-fit turning circle waypoint, configured to perform the curve fitting on the to-be-fit turning circle waypoint and the first target path point to obtain a transition path curve; and a transition path sequence determination module, configured to sample the transition path curve to obtain a transition path sequence.

As for the apparatus embodiments, because they are basically similar to the method embodiments, the description is relatively simple, and the relevant points may be referred to the partial description of method embodiments.

Figure 7:
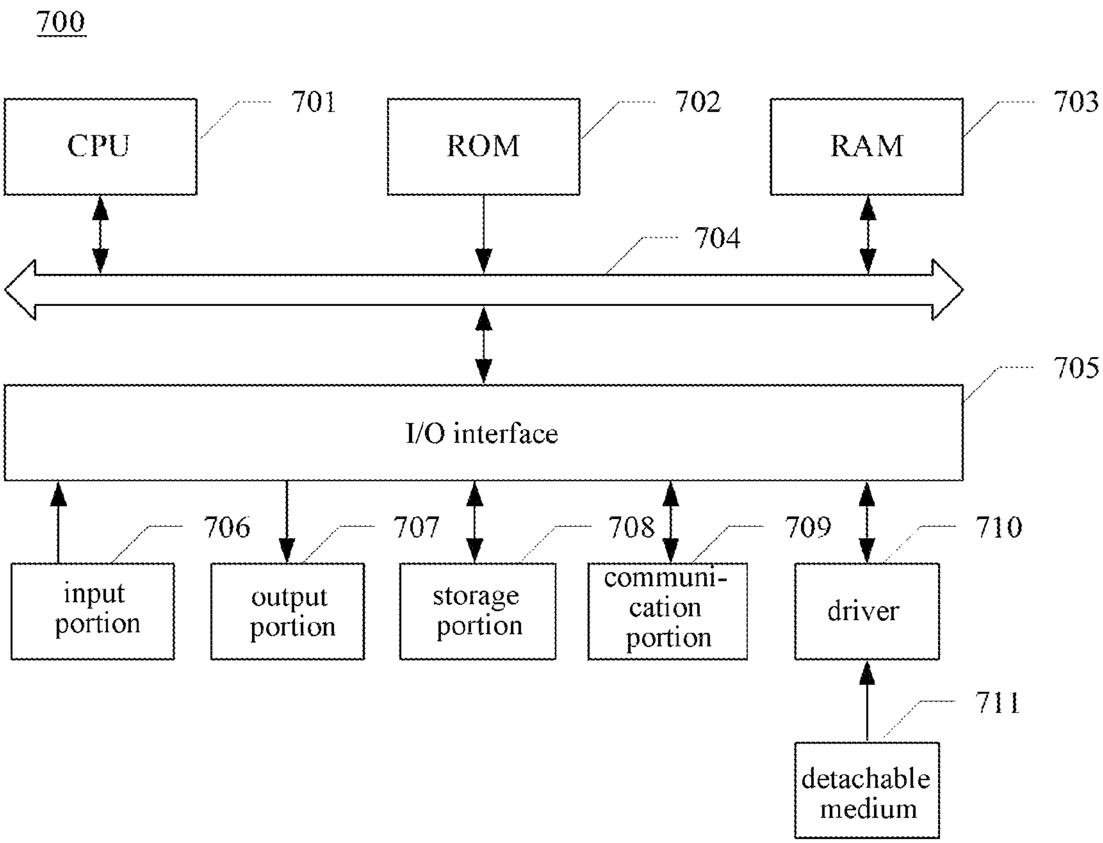
FIG. 7 is a structural schematic diagram of a computer system of an electronic device in one or more embodiment of the present disclosure.

Referring to FIG. 7, an embodiment of the present disclosure further discloses an electronic device, which includes a processor, a memory and a computer program stored in the memory and capable of running on the processor. When the computer program is executed by the processor, the steps of the path planning method for the virtual character described above are realized, for example:

acquiring a start point and an end point of the virtual character in a game scene, and determining an initial path sequence connecting the start point and the end point based on the game scene;

obtaining a fitting curve by performing curve fitting on the initial path sequence;

obtaining a sampling path sequence by sampling the fitting curve, where the sampling path sequence includes a plurality of sampling path points;

determining a plurality of sub-path sequences for forming bends in the sampling path sequence, where each sub-path sequence consists of turning path points forming a same bend; and when a turning radius of the turning path point in the sub-path sequence is less than a preset first turning radius threshold, updating a path corresponding to the sub-path sequences in the fitting curve by performing the curve fitting on the turning path points in the sub-path sequence again, and obtaining a target path sequence by sampling an updated fitting curve.

In some embodiments, the determining the initial path sequence connecting the start point and the end point based on the game scene includes:

generating a pathfinding grid model corresponding to the game scene; and determining the initial path sequence from the start point to the end point by adopting a preset pathfinding algorithm, according to the pathfinding grid model.

In some embodiments, the determining the initial path sequence from the start point to the end point by adopting the preset pathfinding algorithm, according to the pathfinding grid model includes:

determining an inflection point from the start point to the end point in the pathfinding grid model;

for each inflection point, when the inflection point is located at a boundary between a walkable region and a non-walkable region in the pathfinding grid model, moving the inflection point to the walkable region along an edge of a grid where the inflection point is located, so as to update the inflection point and obtain a corresponding updated inflection point; and taking the start point, the updated inflection point and the end point as initial path points to obtain the initial path sequence.

In some embodiments, the obtaining the fitting curve by performing the curve fitting on the initial path sequence includes:

taking initial path points in the initial path sequence as control points to construct a cubic Hermite curve, so as to obtain the fitting curve.

In some embodiments, the determining the sub-path sequences for forming the bends in the sampling path sequence, where the sub-path sequence consists of turning path points forming the same bend, includes:

sequentially calculating a tangent-line included angle between tangent vectors of two adjacent sampling path points in the sampling path sequence;

determining two sampling path points with the tangent-line included angle greater than a preset first included angle threshold as the turning path points; and determining a plurality of adjacent turning path points as the sub-path sequence.

In some embodiments, the when the turning radius of the turning path point in the sub-path sequence is less than the preset first turning radius threshold, performing the curve fitting on the turning path points in the sub-path sequence again, includes:

determining a sub-path sequence having the turning path point with the turning radius less than the preset first turning radius threshold as a target sub-path sequence; and when a number of spaced sampling path points between two adjacent target sub-path sequences is less than a preset spaced number threshold, obtaining a new target sub-path sequence by merging the turning path points in the two adjacent target sub-path sequences and the spaced sampling path points.

In some embodiments, the target path sequence consists of a plurality of target path points, and the method further includes:

determining a target path point with a turning radius less than a preset second turning radius threshold in the target path sequence, and determining the target path point with the turning radius less than the preset second turning radius threshold as a curvature to-be-improved path point, where the preset second turning radius threshold is less than the preset first turning radius threshold;

determining a plurality of adjacent curvature to-be-improved path points as a curvature to-be-improved path sequence;

for each curvature to-be-improved path sequence, determining a minimum turning radius circle corresponding to the curvature to-be-improved path sequence; and determining a mapping point of the curvature to-be-improved path point in the curvature to-be-improved path sequence on a circumference of the minimum turning radius circle, and updating the corresponding curvature to-be-improved path point by using the mapping point.

In some embodiments, the method further includes:

when an arc length between two adjacent mapping points on the minimum turning radius circle is greater than a preset length threshold, adding at least one mapping point between the two adjacent mapping points.

In some embodiments, the target path sequence includes another target path points in addition to the curvature to-be-improved path points, and the method further includes:

sequentially calculating a transition fitting curve obtained by performing the curve fitting on the another target path points and the mapping points, according to a sequence from near to far with respect to the minimum turning radius circle; and when the transition fitting curve meets the preset conditions, splicing the mapping points with the another target path points in the target path sequence to update the target path sequence.

In some embodiments, the method further includes:

determining two minimum turning circles for the virtual character according to the start point, an orientation and a minimum turning radius of the virtual character;

determining a target minimum turning circle corresponding to a starting mode according to the starting mode of the virtual character, where the starting mode includes forward-left turn, forward-right turn, backward-left turn and backward-right turn;

determining a transition path sequence corresponding to each starting mode according to the target minimum turning circle and a first target path point firstly located outside the target minimum turning circle in the target path sequence;

determining a target transition path sequence from the transition path sequence; and processing the target path sequence according to the target transition path sequence to obtain a processed target path sequence.

In some embodiments, the determining the transition path sequence corresponding to each starting mode according to the target minimum turning circle and the first target path point firstly located outside the target minimum turning circle in the target path sequence includes:

sampling the target minimum turning circle to obtain a turning circle waypoint;

determining whether the turning circle waypoint is located in a walkable region of the game scene;

if so, determining the first target path point firstly located outside the target turning minimum circle in the target path sequence, and determining a target turning circle waypoint in the target minimum turning circle, where the target turning circle waypoint is a turning circle waypoint closest to the first target path point in a reverse direction of a path corresponding to the starting mode in the target minimum turning circle;

calculating a turning-tangent-line included angle between tangent lines of the first target path point and the target turning circle waypoint;

if the turning-tangent-line included angle is less than a preset second included angle threshold, acquiring a turning circle waypoint between the target turning circle waypoint and the start point as a to-be-fit turning circle waypoint;

performing curve fitting on the to-be-fit turning circle waypoint and the first target path point to obtain a transition path curve; and sampling the transition path curve to obtain a transition path sequence.

The path points of the target path sequence generated by the above embodiment are smooth and uniform, which is convenient to control a movement of the virtual character, and may realize the smooth movement of the virtual character, which conforms to the movement law.

As shown in FIG. 7, a computer system 700 includes a central processing unit (CPU) 701, which may be loaded into a random access memory (RAM) 703 according to a program stored in a read-only memory (ROM) 702 or from a storage portion 708 to perform various appropriate actions and processes. In the RAM 703, various programs and data required for the operation of the system are also stored. The CPU 701, the ROM 702, and the RAM 703 are connected to each other through a bus 704. An input/output (I/O) interface 705 is also connected to the bus 704.

The following components are connected to the I/O interface 705: an input portion 706 including a keyboard, a mouse, and the like; an output portion 707 including a cathode ray tube (CRT), a liquid crystal display (LCD), a speaker, and the like; a storage portion 708 including a hard disk, and the like; and a communication portion 709 including a network interface card such as a local area network (LAN) card, a modem, and the like. The communication portion 709 performs communication processing via a network such as the Internet. A driver 710 is also connected to the I/O interface 705 as needed. A detachable medium 711, such as a magnetic disk, an optical disk, a magneto-optical disk, and a semiconductor memory, etc., is installed on the driver 710 as needed, such that a computer program read out therefrom is installed into the storage portion 708 as needed.

In particular, according to an embodiment of the present disclosure, the process described blow with reference to the flowchart may be implemented as a computer software program. For example, an embodiment of the present disclosure includes a computer program product including a computer program carried on a computer-readable medium, the computer program containing a program code for performing the method shown in the flowchart. In such an embodiment, the computer program may be downloaded and installed from a network through the communication portion 709, and/or installed from the detachable medium 711. When the computer program is executed by the CPU 701, the above functions defined in the system of the present disclosure are performed.

It is to be noted that the computer-readable medium shown in the embodiments of the present disclosure may be a computer-readable signal medium or a computer-readable storage medium or any combination of the foregoing. The computer-readable storage medium may be, for example, but not limited to, an electronic, magnetic, optical, electromagnetic, infrared, or semiconductor system, apparatus, or device, or any combination thereof. A more specific example of the computer-readable storage medium may include, but is not limited to: an electric connection with one or more wires, a portable computer disk, a hard disk, a RAM, a ROM, an erasable programmable ROM (EPROM), a flash memory, an optical fiber, a portable compact disc ROM (CD-ROM), an optical storage device, a magnetic storage device, or any suitable combination of the foregoing. In the present disclosure, the computer-readable storage medium may be any tangible medium that contains or stores a program. The program may be used by or in combination with an instruction execution system, apparatus, or device. In the present disclosure, the computer-readable signal medium may include a data signal that is propagated in a baseband or as part of a carrier, carrying computer-readable program codes. Such propagated data signals may take a variety of forms including, but not limited to, electromagnetic signals, optical signals, or any suitable combination of the foregoing. The computer-readable signal medium may also be any computer-readable medium other than a computer-readable storage medium, and the non-transitory computer-readable medium may send, propagate, or transmit a program for use by or in connection with an instruction execution system, apparatus, or device. Program codes included in the computer-readable medium may be transmitted by any suitable medium, including but not limited to wireless, wired, etc., or any suitable combination of the foregoing.

The flowchart and block diagram in the accompanying drawings illustrate the architecture, functionality, and operation of possible implementations of systems, methods and computer program products according to various embodiments of the present disclosure. In this regard, each block in the flowchart or block diagram may represent a module, a program segment, or a part of code, which contains one or more executable instructions for implementing a specified logical function. It should also be noted that in some alternative implementations, the functions noted in the blocks may also occur in a different order than those marked in the drawings. For example, two successively represented blocks may actually be executed substantially in parallel, and they may sometimes be executed in the reverse order, depending on the functions involved. It should also be noted that each block in the block diagrams or flowcharts, and combinations of blocks in the block diagrams or flowcharts may be implemented by a dedicated hardware-based system that performs specified functions or operations, or may be implemented with a combination of dedicated hardware and computer instructions.

The units described in the embodiments of the present disclosure may be implemented by software or hardware. The described units may also be provided in a processor. The names of the units do not, in some cases, define the units themselves.

As another aspect, the present disclosure also provides a non-transitory computer-readable medium, which may be included in the electronic device described in the above embodiments; or may exist alone without being assembled into the electronic device. The non-transitory computer-readable medium carries one or more programs. When the one or more programs are executed by the electronic device, the one or more programs cause the electronic device to realize the method described in the above embodiments.

It should be noted that although several modules or units of a device for action execution are mentioned in the above detailed description, this division is not mandatory. In fact, according to the embodiments of the present disclosure, features and functions of two or more modules or units described above may be embodied in one module or unit. On the contrary, the features and functions of one module or unit described above may be further divided into being embodied by multiple modules or units.

Through the description of the above embodiments, it is easy for those skilled in the art to understand that the example embodiments described here may be realized by software or by combining software with necessary hardware. Therefore, the technical solution according to the embodiments of the present disclosure may be embodied in the form of a software product, which may be stored in a non-volatile storage medium (which may be CD-ROM, USB flash drive, mobile hard disk, etc.) or on the network, and includes several instructions to make a computing device (which may be a personal computer, a server, a touch terminal, or a network device, etc.) execute the method according to the embodiments of the present disclosure.

An embodiment of the present disclosure further discloses a non-transitory computer-readable storage medium, on which a computer program is stored, and the computer program, when executed by a processor, realizes the steps of the path planning method for the virtual character as described above, for example:

acquiring a start point and an end point of the virtual character in a game scene, and determining an initial path sequence connecting the start point and the end point based on the game scene;

obtaining a fitting curve by performing curve fitting on the initial path sequence;

obtaining a sampling path sequence by sampling the fitting curve, where the sampling path sequence includes a plurality of sampling path points;

determining a plurality of sub-path sequences for forming bends in the sampling path sequence, where each sub-path sequence consists of turning path points forming a same bend; and when a turning radius of the turning path point in the sub-path sequence is less than a preset first turning radius threshold, updating a path corresponding to the sub-path sequences in the fitting curve by performing the curve fitting on the turning path points in the sub-path sequence again, and obtaining a target path sequence by sampling an updated fitting curve.

In some embodiments, the determining the initial path sequence connecting the start point and the end point based on the game scene includes:

generating a pathfinding grid model corresponding to the game scene; and determining the initial path sequence from the start point to the end point by adopting a preset pathfinding algorithm, according to the pathfinding grid model.

In some embodiments, the determining the initial path sequence from the start point to the end point by adopting the preset pathfinding algorithm, according to the pathfinding grid model includes:

determining an inflection point from the start point to the end point in the pathfinding grid model;

for each inflection point, when the inflection point is located at a boundary between a walkable region and a non-walkable region in the pathfinding grid model, moving the inflection point to the walkable region along an edge of a grid where the inflection point is located, so as to update the inflection point and obtain a corresponding updated inflection point; and taking the start point, the updated inflection point and the end point as initial path points to obtain the initial path sequence.

In some embodiments, the obtaining the fitting curve by performing the curve fitting on the initial path sequence includes:

taking initial path points in the initial path sequence as control points to construct a cubic Hermite curve, so as to obtain the fitting curve.

In some embodiments, the determining the sub-path sequences for forming the bends in the sampling path sequence, where the sub-path sequence consists of turning path points forming the same bend, includes:

sequentially calculating a tangent-line included angle between tangent vectors of two adjacent sampling path points in the sampling path sequence;

determining two sampling path points with the tangent-line included angle greater than a preset first included angle threshold as the turning path points; and determining a plurality of adjacent turning path points as the sub-path sequence.

In some embodiments, the when the turning radius of the turning path point in the sub-path sequence is less than the preset first turning radius threshold, performing the curve fitting on the turning path points in the sub-path sequence again, includes:

determining a sub-path sequence having the turning path point with the turning radius less than the preset first turning radius threshold as a target sub-path sequence; and when a number of spaced sampling path points between two adjacent target sub-path sequences is less than a preset spaced number threshold, obtaining a new target sub-path sequence by merging the turning path points in the two adjacent target sub-path sequences and the spaced sampling path points.

In some embodiments, the target path sequence consists of a plurality of target path points, and the method further includes:

determining a target path point with a turning radius less than a preset second turning radius threshold in the target path sequence, and determining the target path point with the turning radius less than the preset second turning radius threshold as a curvature to-be-improved path point, where the preset second turning radius threshold is less than the preset first turning radius threshold;

determining a plurality of adjacent curvature to-be-improved path points as a curvature to-be-improved path sequence;

for each curvature to-be-improved path sequence, determining a minimum turning radius circle corresponding to the curvature to-be-improved path sequence; and determining a mapping point of the curvature to-be-improved path point in the curvature to-be-improved path sequence on a circumference of the minimum turning radius circle, and updating the corresponding curvature to-be-improved path point by using the mapping point.

In some embodiments, the method further includes:

when an arc length between two adjacent mapping points on the minimum turning radius circle is greater than a preset length threshold, adding at least one mapping point between the two adjacent mapping points.

In some embodiments, the target path sequence includes another target path points in addition to the curvature to-be-improved path points, and the method further includes:

sequentially calculating a transition fitting curve obtained by performing the curve fitting on the another target path points and the mapping points, according to a sequence from near to far with respect to the minimum turning radius circle; and when the transition fitting curve meets the preset conditions, splicing the mapping points with the another target path points in the target path sequence to update the target path sequence.

In some embodiments, the method further includes:

determining two minimum turning circles for the virtual character according to the start point, an orientation and a minimum turning radius of the virtual character;

determining a target minimum turning circle corresponding to a starting mode according to the starting mode of the virtual character, where the starting mode includes forward-left turn, forward-right turn, backward-left turn and backward-right turn;

determining a transition path sequence corresponding to each starting mode according to the target minimum turning circle and a first target path point firstly located outside the target minimum turning circle in the target path sequence;

determining a target transition path sequence from the transition path sequence; and processing the target path sequence according to the target transition path sequence to obtain a processed target path sequence.

In some embodiments, the determining the transition path sequence corresponding to each starting mode according to the target minimum turning circle and the first target path point firstly located outside the target minimum turning circle in the target path sequence includes:

sampling the target minimum turning circle to obtain a turning circle waypoint;

determining whether the turning circle waypoint is located in a walkable region of the game scene;

if so, determining the first target path point firstly located outside the target turning minimum circle in the target path sequence, and determining a target turning circle waypoint in the target minimum turning circle, where the target turning circle waypoint is a turning circle waypoint closest to the first target path point in a reverse direction of a path corresponding to the starting mode in the target minimum turning circle;

calculating a turning-tangent-line included angle between tangent lines of the first target path point and the target turning circle waypoint;

if the turning-tangent-line included angle is less than a preset second included angle threshold, acquiring a turning circle waypoint between the target turning circle waypoint and the start point as a to-be-fit turning circle waypoint;

performing curve fitting on the to-be-fit turning circle waypoint and the first target path point to obtain a transition path curve; and sampling the transition path curve to obtain a transition path sequence.

The path points of the target path sequence generated by the above embodiment are smooth and uniform, which is convenient to control a movement of the virtual character, and may realize the smooth movement of the virtual character, which conforms to the movement law.

Each embodiment in the present specification is described in a progressive way, and each embodiment focuses on its differences from other embodiments. The same and similar parts between embodiments are referred to each other.

Those skilled in the art will appreciate that embodiments of the disclosed embodiments may be provided as a method, apparatus, or computer program product. Thus, embodiments of the present disclosure may take the form of an entirely hardware embodiment, an entirely software embodiment, or a combination of software and hardware. Moreover, embodiments of the present disclosure may take the form of a computer program product embodied on one or more computer usable storage medium (including and not limited to disk storage, CD-ROM, optical storage, etc.) including computer usable program code.

Embodiments of the present disclosure are described with reference to flowchart and/or block diagrams of methods, terminal devices (systems), and computer program products according to embodiments of the present disclosure. It should be understood that each process and/or block of the flowchart and/or the block diagrams, and a combination of process and/or block of the flowchart and/or the block diagrams by computer program instructions may be implemented. The computer instructions may be provided to a general purpose computer, special purpose computer, embedded processor or other programmable data processing terminal device to produce a machine such that instructions executed by a processor of a computer or other programmable data processing terminal device are configured to produce a device for implementing the functions specified in one or more of the processes in the flowchart and/or in one or more blocks of the diagram blocks.

The computer program instructions may further be stored in a computer readable memory that may direct a computer or other programmable data processing terminal device to operate in a particular manner, such that the instructions stored in the computer readable memory produce a product including the instruction device. The instruction device implements the functions specified in one or more of the processes in the flowchart and/or in one or more blocks of the diagram blocks.

These computer program instructions may further be loaded onto a computer or other programmable data processing terminal device, such that a series of operational steps are performed on the computer or other programmable terminal device to produce computer-implemented processing, such that the instructions executed on the computer or other programmable terminal device provide steps for implementing the functions specified in one or more of the processes in the flowchart and/or in one or more blocks of the diagram blocks.

While the preferred embodiment of the present disclosure has been described, those skilled in the art may make further changes and modifications to the embodiments upon learning the essential inventive concept of the present disclosure. Therefore, the appended claims are intended to be interpreted as including the preferred embodiments and the modifications and variations falling into the scope of the embodiments of the present disclosure.

Finally, it should also be noted that in this context, relational terms such as first and second are used merely to distinguish one entity or operation from another entity or operation, and do not necessarily require or imply that there is relation or sequence between these entities or operations. Furthermore, the terms "including", "containing" or any other variations that are intended to encompass a non-exclusive inclusion, such that a process, method, article, or terminal device that includes a plurality of elements includes not only those elements but also other elements that are named specifically, or include elements inherent to such a process, method, article, or terminal device. An element defined by the phrase "including a . . . " does not exclude the presence of additional identical elements in the process, method, article, or terminal device that includes the element, without further limitation.

The path planning method and apparatus for the virtual character, electronic device and non-transitory storage medium as provided in the present disclosure are described in detail above, and the principles and the embodiments of the present disclosure are depicted through specific examples. However, the description of the above embodiments is only used to contribute to understand the method and the gist of the present disclosure. According to the gist of the present disclosure, modifications in the specific embodiments and in the applications of the present disclosure may easily occur to those skilled in the art. In general, the contents contained in the present description should not be construed as a limit to the present disclosure.

What is claimed is:

1. A path planning method for a virtual character, wherein the virtual character is controlled by Artificial Intelligence (AI), and the method comprises:

acquiring a start point and an end point of the virtual character in a game scene;

generating a pathfinding grid model corresponding to the game scene;

determining an inflection point from the start point to the end point according to the pathfinding grid model of the game scene;

for each inflection point, in response to determining that the inflection point is located at a boundary between a walkable region and a non-walkable region in the pathfinding grid model, moving the inflection point to the walkable region along an edge of a grid of the pathfinding grid model where the inflection point is located, to update the inflection point and obtain an updated inflection point;

taking the start point, the updated inflection point and the end point as initial path points to obtain an initial path sequence;

taking the initial path points in the initial path sequence as control points to obtain a fitting curve;

obtaining a sampling path sequence by sampling the fitting curve at an equal length, wherein the sampling path sequence comprises a plurality of sampling path points;

determining a plurality of sub-path sequences for forming bends in the sampling path sequence, wherein each sub-path sequence comprises turning path points forming a same bend; and in response to determining that a turning radius of the turning path point in the sub-path sequence is less than a preset first turning radius threshold corresponding to kinematic constraints of the virtual character controlled by the AI, updating a path corresponding to the sub-path sequences in the fitting curve by performing the curve fitting on the turning path points in the sub-path sequence again, and obtaining a target path sequence that satisfies the kinematic constraints by sampling an updated fitting curve;

wherein moving the inflection point to the walkable region along the edge of the grid where the inflection point is located, to update the inflection point and obtain the updated inflection point comprises:

in response to determining that a length of the edge of the grid where the inflection point is located is greater than or equal to a preset length, moving the inflection point a first distance to the walkable region along the edge of the grid where the inflection point is located, to obtain the updated inflection point; wherein the preset length is a maximum width of the virtual character, and the first distance is half of the maximum width of the virtual character;

in response to determining that the length of the edge of the grid where the inflection point is located is less than the preset length, moving the inflection point a second distance to the walkable region along the edge of the grid where the inflection point is located, to obtain the updated inflection point; wherein the second distance is half or one third of the edge of the grid where the inflection point is located;

wherein in response to determining that the turning radius of the turning path point in the sub-path sequence is less than the preset first turning radius threshold, performing the curve fitting on the turning path points in the sub-path sequence again comprises:

determining a sub-path sequence having the turning path point with the turning radius less than the preset first turning radius threshold as a target sub-path sequence; and in response to determining that a number of spaced sampling path points between two adjacent target sub-path sequences is less than a preset spaced number threshold, obtaining a new target sub-path sequence by merging the turning path points in the two adjacent target sub-path sequences and the spaced sampling path points;

wherein the target path sequence comprises a plurality of target path points, and the method further comprises:

determining a target path point with a turning radius less than a preset second turning radius threshold in the target path sequence, and determining the target path point with the turning radius less than the preset second turning radius threshold as a curvature to-be-improved path point, wherein the preset second turning radius threshold is less than the preset first turning radius threshold;

determining a plurality of adjacent curvature to-be-improved path points as a curvature to-be-improved path sequence;

for each curvature to-be-improved path sequence, determining a minimum turning radius circle corresponding to the curvature to-be-improved path sequence; and determining a mapping point of the curvature to-be-improved path point in the curvature to-be-improved path sequence on a circumference of the minimum turning radius circle, and updating the curvature to-be-improved path point by the mapping point.

2. The method according to claim 1, wherein the method further comprises:

determining, according to the pathfinding grid model, the initial path sequence from the start point to the end point by adopting a preset pathfinding algorithm.

3. The method according to claim 1, wherein the fitting curve is a cubic Hermite curve.

4. The method according to claim 1, wherein determining the sub-path sequences for forming the bends in the sampling path sequence, wherein the sub-path sequence comprises the turning path points forming the same bend, comprises:

sequentially calculating a tangent-line included angle between tangent vectors of two adjacent sampling path points in the sampling path sequence;

determining two sampling path points with the tangent-line included angle greater than a preset first included angle threshold as the turning path points; and determining a plurality of adjacent turning path points as the sub-path sequence.

5. The method according to claim 1, further comprising:

in response to determining that an arc length between two adjacent mapping points on the minimum turning radius circle is greater than a preset length threshold, adding at least one mapping point between the two adjacent mapping points.

6. The method according to claim 5, wherein the plurality of target path points in the target path sequence comprises second target path points in addition to the curvature to-be-improved path points, and the method further comprises:

sequentially calculating a transition fitting curve obtained by performing the curve fitting on the second target path points and the mapping points in an ascending order of distances between the second target path points and the minimum turning radius circle; and in response to determining that the transition fitting curve meets a preset condition, splicing the mapping points with the second target path points in the target path sequence, to update the target path sequence.

7. The method according to claim 1, wherein the target path sequence comprises a plurality of target path points, and the method further comprises:

determining two minimum turning circles for the virtual character according to the start point, an orientation and a minimum turning radius of the virtual character;

determining a target minimum turning circle corresponding to a starting mode according to the starting mode of the virtual character, wherein the starting mode comprises forward-left turn, forward-right turn, backward-left turn and backward-right turn;

determining a transition path sequence corresponding to each starting mode according to the target minimum turning circle and a first target path point, wherein the first target point is a target path point firstly located outside the target minimum turning circle in the target path sequence;

determining a target transition path sequence from the transition path sequence; and processing the target path sequence according to the target transition path sequence to obtain a processed target path sequence.

8. The method according to claim 7, wherein determining the transition path sequence corresponding to each starting mode according to the target minimum turning circle and the first target path point firstly located outside the target minimum turning circle in the target path sequence comprises:

sampling the target minimum turning circle to obtain a turning circle waypoint;

determining whether the turning circle waypoint is located in a walkable region of the game scene;

in response to determining that the turning circle waypoint is located in the walkable region, determining the first target path point firstly located outside the target turning minimum circle in the target path sequence, and determining a target turning circle waypoint in the target minimum turning circle, wherein the target turning circle waypoint is a turning circle waypoint closest to the first target path point in a reverse direction of a path corresponding to the starting mode in the target minimum turning circle;

calculating a turning-tangent-line included angle between tangent lines of the first target path point and the target turning circle waypoint;

in response to determining that the turning-tangent-line included angle is less than a preset second included angle threshold, acquiring a turning circle waypoint between the target turning circle waypoint and the start point as a to-be-fit turning circle waypoint;

performing the curve fitting on the to-be-fit turning circle waypoint and the first target path point to obtain a transition path curve; and sampling the transition path curve to obtain a transition path sequence.

9. An electronic device, comprising a processor, a memory, and a computer program stored in the memory and capable of running on the processor, wherein when the the computer program is executed by the processor, the processor is configured to:

acquire a start point and an end point of a virtual character in a game scene; wherein the virtual character is controlled by Artificial Intelligence (AI);

generate a pathfinding grid model corresponding to the game scene;

determine an inflection point from the start point to the end point according to the pathfinding grid model of the game scene;

for each inflection point, in response to determining that the inflection point is located at a boundary between a walkable region and a non-walkable region in the pathfinding grid model, move the inflection point to the walkable region along an edge of a grid of the pathfinding grid model where the inflection point is located, to update the inflection point and obtain an updated inflection point;

take the start point, the updated inflection point and the end point as initial path points to obtain an initial path sequence;

take the initial path points in the initial path sequence as control points to obtain a fitting curve;

obtain a sampling path sequence by sampling the fitting curve at an equal length, wherein the sampling path sequence comprises a plurality of sampling path points;

determine a plurality of sub-path sequences for forming bends in the sampling path sequence, wherein each sub-path sequence comprises turning path points forming a same bend; and in response to determining that a turning radius of the turning path point in the sub-path sequence is less than a preset first turning radius threshold corresponding to kinematic constraints of the virtual character controlled by the AI, update a path corresponding to the sub-path sequences in the fitting curve by performing the curve fitting on the turning path points in the sub-path sequence again, and obtain a target path sequence that satisfies the kinematic constraints by sampling an updated fitting curve;

wherein the processor is further configured to:

in response to determining that a length of the edge of the grid where the inflection point is located is greater than or equal to a preset length, move the inflection point a first distance to the walkable region along the edge of the grid where the inflection point is located, to obtain the updated inflection point; wherein the preset length is a maximum width of the virtual character, and the first distance is half of the maximum width of the virtual character;

in response to determining that the length of the edge of the grid where the inflection point is located is less than the preset length, move the inflection point a second distance to the walkable region along the edge of the grid where the inflection point is located, to obtain the updated inflection point; wherein the second distance is half or one third of the edge of the grid where the inflection point is located;

wherein the processor is further configured to:

determine a sub-path sequence having the turning path point with the turning radius less than the preset first turning radius threshold as a target sub-path sequence; and in response to determining that a number of spaced sampling path points between two adjacent target sub-path sequences is less than a preset spaced number threshold, obtain a new target sub-path sequence by merging the turning path points in the two adjacent target sub-path sequences and the spaced sampling path points;

wherein the target path sequence comprises a plurality of target path points, and the processor is further configured to:

determine a target path point with a turning radius less than a preset second turning radius threshold in the target path sequence, and determine the target path point with the turning radius less than the preset second turning radius threshold as a curvature to-be-improved path point, wherein the preset second turning radius threshold is less than the preset first turning radius threshold;

determine a plurality of adjacent curvature to-be-improved path points as a curvature to-be-improved path sequence;

for each curvature to-be-improved path sequence, determine a minimum turning radius circle corresponding to the curvature to-be-improved path sequence; and determine a mapping point of the curvature to-be-improved path point in the curvature to-be-improved path sequence on a circumference of the minimum turning radius circle, and update the curvature to-be-improved path point by the mapping point.

10. A non-transitory computer-readable storage medium, wherein a computer program is stored on the computer-readable storage medium, and the computer program, when executed by a processor, cause the processor to:

acquire a start point and an end point of a virtual character in a game scene, wherein the virtual character is controlled by Artificial Intelligence (AI);

generate a pathfinding grid model corresponding to the game scene;

determine an inflection point from the start point to the end point according to the pathfinding grid model of the game scene;

for each inflection point, in response to determining that the inflection point is located at a boundary between a walkable region and a non-walkable region in the pathfinding grid model, move the inflection point to the walkable region along an edge of a grid of the pathfinding grid model where the inflection point is located, to update the inflection point and obtain an updated inflection point;

take the start point, the updated inflection point and the end point as initial path points to obtain an initial path sequence;

take the initial path points in the initial path sequence as control points to obtain a fitting curve;

obtain a sampling path sequence by sampling the fitting curve at an equal length, wherein the sampling path sequence comprises a plurality of sampling path points;

determine a plurality of sub-path sequences for forming bends in the sampling path sequence, wherein each sub-path sequence comprises turning path points forming a same bend; and in response to determining that a turning radius of the turning path point in the sub-path sequence is less than a preset first turning radius threshold corresponding to kinematic constraints of the virtual character controlled by the AI, update a path corresponding to the sub-path sequences in the fitting curve by performing the curve fitting on the turning path points in the sub-path sequence again, and obtain a target path sequence that satisfies the kinematic constraints by sampling an updated fitting curve;

wherein the processor is further configured to:

in response to determining that a length of the edge of the grid where the inflection point is located is greater than or equal to a preset length, move the inflection point a first distance to the walkable region along the edge of the grid where the inflection point is located, to obtain the updated inflection point; wherein the preset length is a maximum width of the virtual character, and the first distance is half of the maximum width of the virtual character;

in response to determining that the length of the edge of the grid where the inflection point is located is less than the preset length, move the inflection point a second distance to the walkable region along the edge of the grid where the inflection point is located, to obtain the updated inflection point; wherein the second distance is half or one third of the edge of the grid where the inflection point is located;

wherein the processor is further configured to:

determine a sub-path sequence having the turning path point with the turning radius less than the preset first turning radius threshold as a target sub-path sequence; and in response to determining that a number of spaced sampling path points between two adjacent target sub-path sequences is less than a preset spaced number threshold, obtain a new target sub-path sequence by merging the turning path points in the two adjacent target sub-path sequences and the spaced sampling path points;

wherein the target path sequence comprises a plurality of target path points, and the processor is further configured to:

determine a target path point with a turning radius less than a preset second turning radius threshold in the target path sequence, and determine the target path point with the turning radius less than the preset second turning radius threshold as a curvature to-be-improved path point, wherein the preset second turning radius threshold is less than the preset first turning radius threshold;

determine a plurality of adjacent curvature to-be-improved path points as a curvature to-be-improved path sequence;

for each curvature to-be-improved path sequence, determine a minimum turning radius circle corresponding to the curvature to-be-improved path sequence; and determine a mapping point of the curvature to-be-improved path point in the curvature to-be-improved path sequence on a circumference of the minimum turning radius circle, and update the curvature to-be-improved path point by the mapping point.

11. The method according to claim 1, wherein the initial path sequence is a shortest path sequence among all paths that the virtual character passes through a movable region from the start point to the end point.

12. The method according to claim 4, wherein the preset first included angle threshold is 20 degrees.

13. The method according to claim 1, wherein the preset first turning radius threshold is than a minimum turning radius of the virtual character.

14. The method according to claim 13, wherein the preset first turning radius threshold is equal to twice the minimum turning radius of the virtual character.

15. The method according to claim 1, wherein the preset second turning radius threshold is the minimum turning radius of the virtual character.

16. The electronic device according to claim 9, wherein the processor is further configured to:

determine, according to the pathfinding grid model, the initial path sequence from the start point to the end point by adopting a preset pathfinding algorithm.

* * * * *